(12) United States Patent
Chande et al.

(10) Patent No.: US 12,126,551 B2
(45) Date of Patent: Oct. 22, 2024

(54) DYNAMIC OPERATING CHANNEL BANDWIDTHS WITH ADJUSTED THRESHOLDS

(71) Applicant: QUALCOMM Incorporated, San Diego, CA (US)

(72) Inventors: Vinay Chande, San Diego, CA (US); Arumugam Chendamarai Kannan, San Diego, CA (US); Srinivas Yerramalli, San Diego, CA (US); Giovanni Chisci, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 17/395,339

(22) Filed: Aug. 5, 2021

(65) Prior Publication Data

US 2022/0052805 A1 Feb. 17, 2022

Related U.S. Application Data

(60) Provisional application No. 63/064,371, filed on Aug. 11, 2020.

(51) Int. Cl.
*H04W 72/0453* (2023.01)
*H04L 5/00* (2006.01)
(Continued)

(52) U.S. Cl.
CPC ........... *H04L 5/0039* (2013.01); *H04W 24/10* (2013.01); *H04W 72/0453* (2013.01); *H04W 72/541* (2023.01)

(58) Field of Classification Search
None
See application file for complete search history.

(56) References Cited

U.S. PATENT DOCUMENTS

2003/0214928 A1* 11/2003 Chuah ..................... H04L 47/70
370/336
2015/0009907 A1* 1/2015 Merlin .............. H04W 74/0808
370/329
(Continued)

FOREIGN PATENT DOCUMENTS

CN 107332633 A * 11/2017 ........... H04B 17/382
WO WO-2021037849 A1 * 3/2021 ............. H04B 1/713

OTHER PUBLICATIONS

3GPP TSG RAN WG1 #82bis—R1-155460, Malmo, Sweden, Oct. 5-9, 2015 (Year: 2015).*
(Continued)

*Primary Examiner* — The Hy Nguyen
(74) *Attorney, Agent, or Firm* — QUALCOMM Incorporated

(57) ABSTRACT

The present disclosure relates to methods and devices for wireless communication including an apparatus, e.g., a UE and/or a base station. In one aspect, the apparatus may measure one or more candidate bandwidths, each of the one or more candidate bandwidths corresponding to a candidate channel. The apparatus may also select an operating bandwidth of the one or more candidate bandwidths based on the measured one or more candidate bandwidths, the operating bandwidth corresponding to an operating channel. Additionally, the apparatus may adjust an energy detection threshold of a reference bandwidth based on a sensing bandwidth. The apparatus may also determine whether a transmission medium is available based on at least one of the adjusted energy detection threshold or an interference level of at least one signal.

30 Claims, 15 Drawing Sheets

(51) Int. Cl.
*H04W 24/10* (2009.01)
*H04W 72/541* (2023.01)

(56) References Cited

U.S. PATENT DOCUMENTS

| | | | | |
|---|---|---|---|---|
| 2016/0081031 | A1* | 3/2016 | Barriac | H04L 43/16 |
| | | | | 370/311 |
| 2017/0353975 | A1* | 12/2017 | Khawer | H04W 8/005 |
| 2018/0235005 | A1* | 8/2018 | Ansari | H04L 27/0006 |
| 2018/0242364 | A1* | 8/2018 | Park | H04W 24/08 |
| 2019/0059104 | A1* | 2/2019 | Gu | H04W 74/0808 |
| 2019/0124695 | A1* | 4/2019 | Seok | H04W 8/005 |
| 2019/0230706 | A1* | 7/2019 | Li | H04B 7/088 |
| 2020/0351679 | A1* | 11/2020 | Jiang | H04W 74/0808 |

OTHER PUBLICATIONS

3GPP TSG RAN WG1 82 Meeting—R1-154342, Beijing, China, Aug. 24-85, 2015 (Year: 2015).*

* cited by examiner

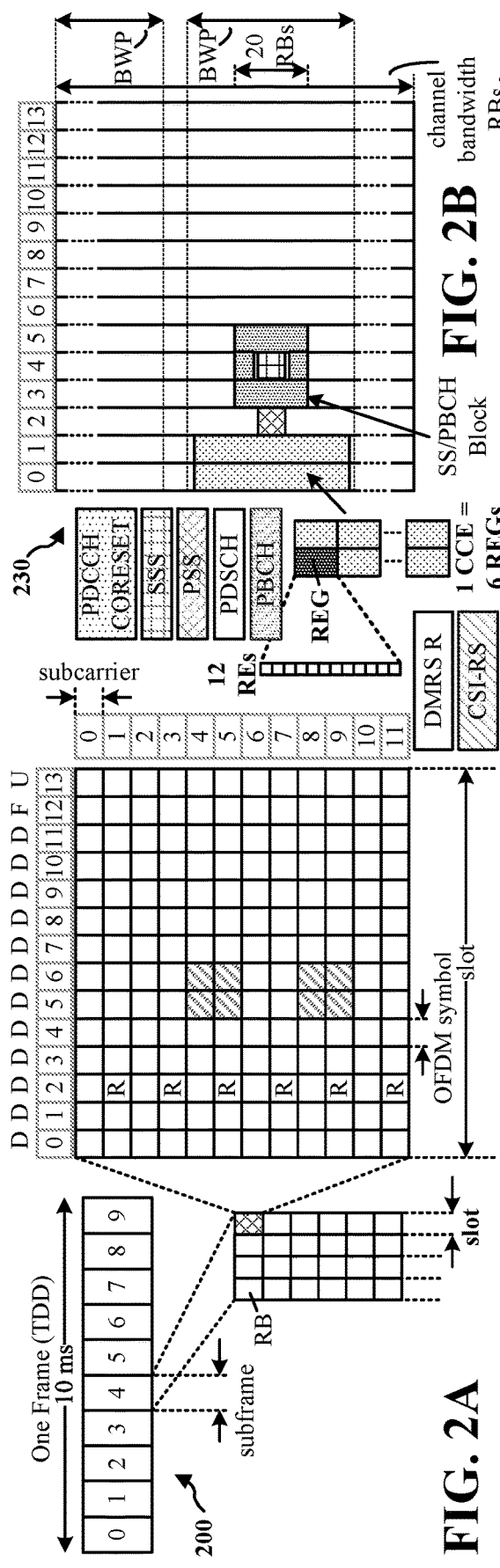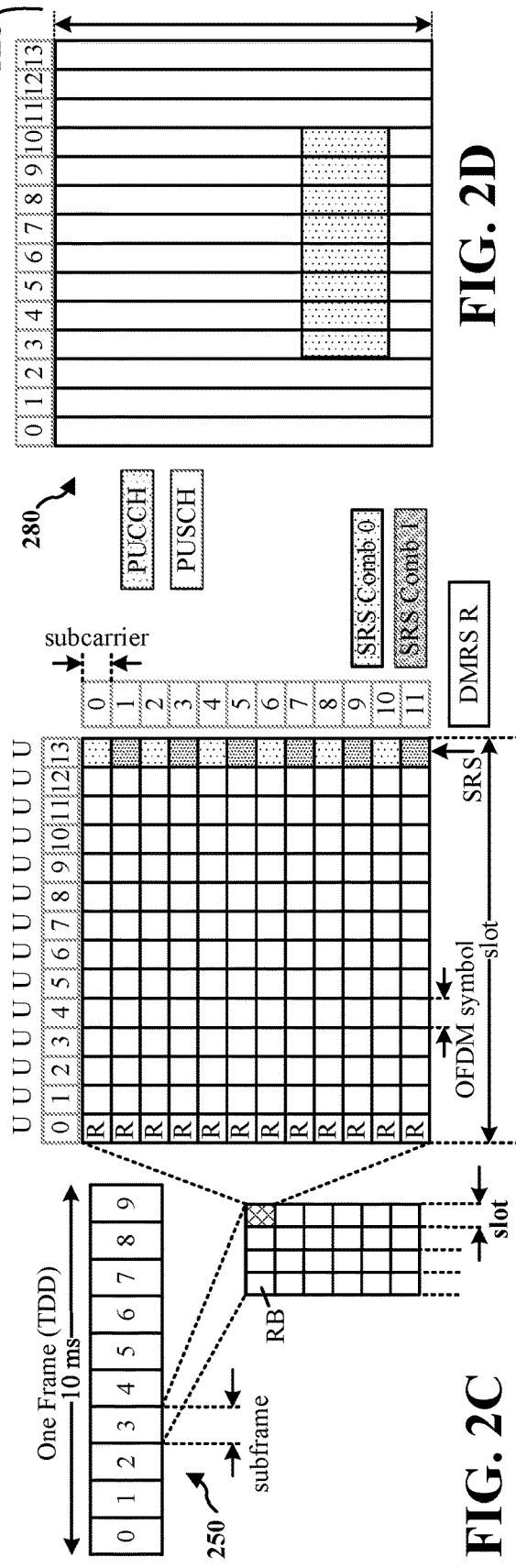
FIG. 2A  FIG. 2B  FIG. 2C  FIG. 2D

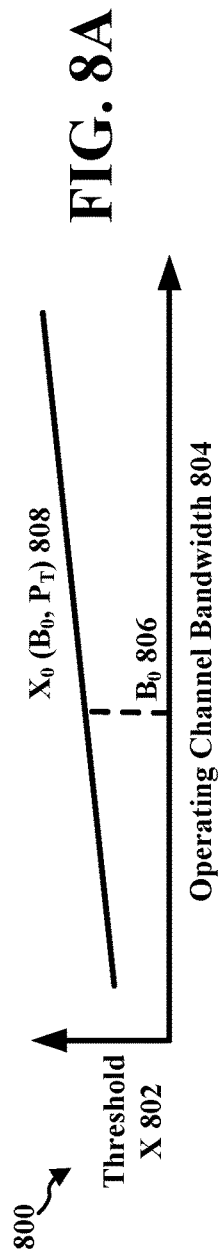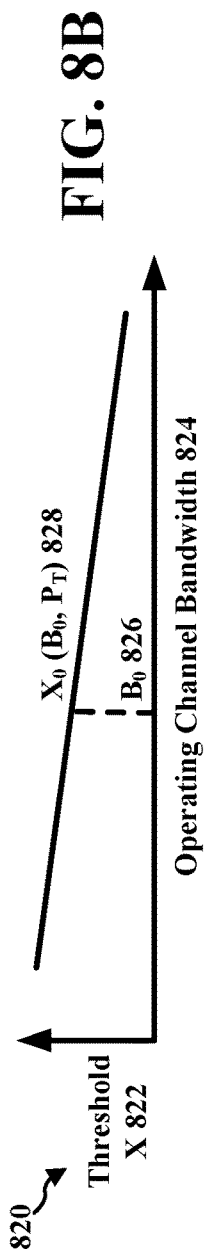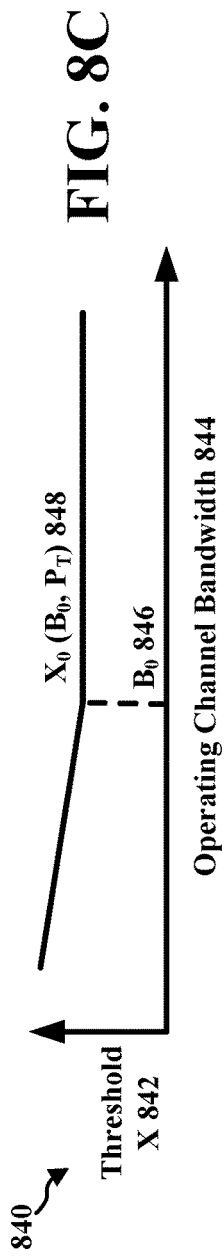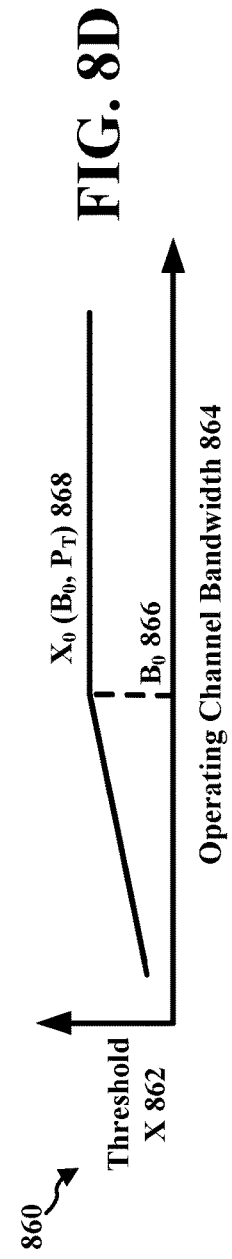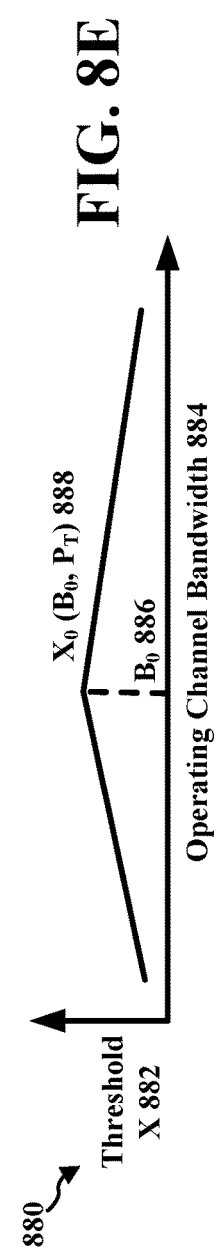

DYNAMIC OPERATING CHANNEL BANDWIDTHS WITH ADJUSTED THRESHOLDS

CROSS REFERENCE TO RELATED APPLICATION(S)

This application claims the benefit of U.S. Provisional Application Ser. No. 63/064,371, entitled "METHODS AND APPARATUS FOR DYNAMIC OPERATING CHANNEL BANDWIDTHS WITH ADJUSTED THRESHOLDS" and filed on Aug. 11, 2020, which is expressly incorporated by reference herein in its entirety.

TECHNICAL FIELD

The present disclosure relates generally to communication systems, and more particularly, to beam transmissions in wireless communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced (pc)mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may measure one or more candidate bandwidths, each of the one or more candidate bandwidths corresponding to a candidate channel. The apparatus may also select an operating bandwidth of the one or more candidate bandwidths based on the measured one or more candidate bandwidths, the operating bandwidth corresponding to an operating channel. Further, the apparatus may determine an energy detection threshold of a reference bandwidth, the energy detection threshold being based on at least one of a transmit power or a power class. The apparatus may also measure an interference level of at least one signal, where a determination whether a transmission medium is available is based on the measured interference level. The apparatus may also adjust an energy detection threshold of a reference bandwidth based on the selected operating bandwidth. Additionally, the apparatus may compare the adjusted energy detection threshold to the interference level of the at least one signal. The apparatus may also determine whether a transmission medium is available based on at least one of the adjusted energy detection threshold or an interference level of at least one signal. Moreover, the apparatus may transmit data via the transmission medium when the interference level of the at least one signal is less than the adjusted energy detection threshold. The apparatus may also refrain from transmitting data via the transmission medium when the interference level of the at least one signal is greater than or equal to the adjusted energy detection threshold.

In another aspect of the disclosure, a method, a computer-readable medium, and an apparatus are provided. The apparatus may be a base station. The apparatus may measure one or more candidate bandwidths, each of the one or more candidate bandwidths corresponding to a candidate channel. The apparatus may also select an operating bandwidth of the one or more candidate bandwidths based on the measured one or more candidate bandwidths, the operating bandwidth corresponding to an operating channel. Further, the apparatus may determine an energy detection threshold of a reference bandwidth, the energy detection threshold being based on at least one of a transmit power or a power class. The apparatus may also measure an interference level of at least one signal, where a determination whether a transmission medium is available is based on the measured interference level. The apparatus may also adjust an energy detection threshold of a reference bandwidth based on the selected operating bandwidth. Additionally, the apparatus may compare the adjusted energy detection threshold to the interference level of the at least one signal. The apparatus may also determine whether a transmission medium is available based on at least one of the adjusted energy detection threshold or an interference level of at least one signal. Moreover, the apparatus may transmit data via the transmission medium when the interference level of the at least one signal is less than the adjusted energy detection threshold. The apparatus may also refrain from transmitting data via the transmission medium when the interference level of the at least one signal is greater than or equal to the adjusted energy detection threshold.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 8A-8E are graphs illustrating a reference threshold compared to an operating channel bandwidth in accordance with one or more techniques of the present disclosure.

DETAILED DESCRIPTION

Figure 1:
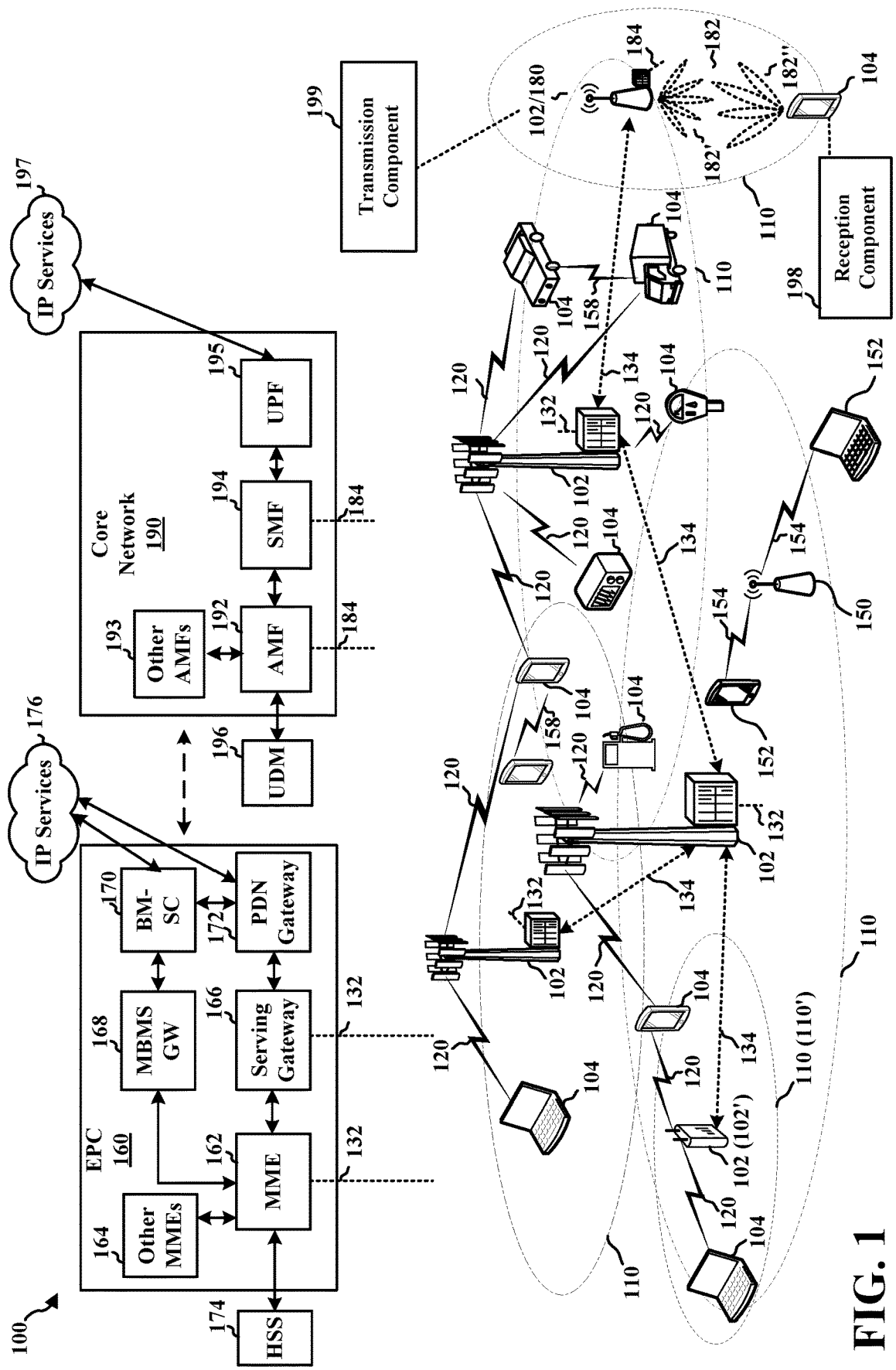
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to measure one or more candidate bandwidths, each of the one or more candidate bandwidths corresponding to a candidate channel. Reception component 198 may also be configured to select an operating bandwidth of the one or more candidate bandwidths based on the measured one or more candidate bandwidths, the operating bandwidth corresponding to an operating channel. Reception component 198 may also be configured to determine an energy detection threshold of a reference bandwidth, the energy detection threshold being based on at least one of a transmit power or a power class. Reception component 198 may also be configured to measure an interference level of at least one signal, where a determination whether a transmission medium is available is based on the measured interference level. Reception component 198 may also be configured to adjust an energy detection threshold of a reference bandwidth based on the selected operating bandwidth. Reception component 198 may also be configured to compare the adjusted energy detection threshold to the interference level of the at least one signal. Reception component 198 may also be configured to determine whether a transmission medium is available based on at least one of the adjusted energy detection threshold or an interference level of at least one signal. Reception component 198 may also be configured to transmit data via the transmission medium when the interference level of the at least one signal is less than the adjusted energy detection threshold. Reception component 198 may also be configured to refrain from transmitting data via the transmission medium when the interference level of the at least one signal is greater than or equal to the adjusted energy detection threshold.

Referring again to FIG. 1, in certain aspects, the base station 180 may include a transmission component 199 configured to measure one or more candidate bandwidths, each of the one or more candidate bandwidths corresponding to a candidate channel. Transmission component 199 may also be configured to select an operating bandwidth of the one or more candidate bandwidths based on the measured one or more candidate bandwidths, the operating bandwidth corresponding to an operating channel. Transmission component 199 may also be configured to determine an energy detection threshold of a reference bandwidth, the energy detection threshold being based on at least one of a transmit power or a power class. Transmission component 199 may also be configured to measure an interference level of at least one signal, where a determination whether a transmission medium is available is based on the measured interference level. Transmission component 199 may also be configured to adjust an energy detection threshold of a reference bandwidth based on the selected operating bandwidth. Transmission component 199 may also be configured to compare the adjusted energy detection threshold to the interference level of the at least one signal. Transmission component 199 may also be configured to determine whether a transmission medium is available based on at least one of the adjusted energy detection threshold or an interference level of at least one signal. Transmission component 199 may also be configured to transmit data via the transmission medium when the interference level of the at least one signal is less than the adjusted energy detection threshold. Transmission component 199 may also be configured to refrain from transmitting data via the transmission medium when the interference level of the at least one signal is greater than or equal to the adjusted energy detection threshold.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where y is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
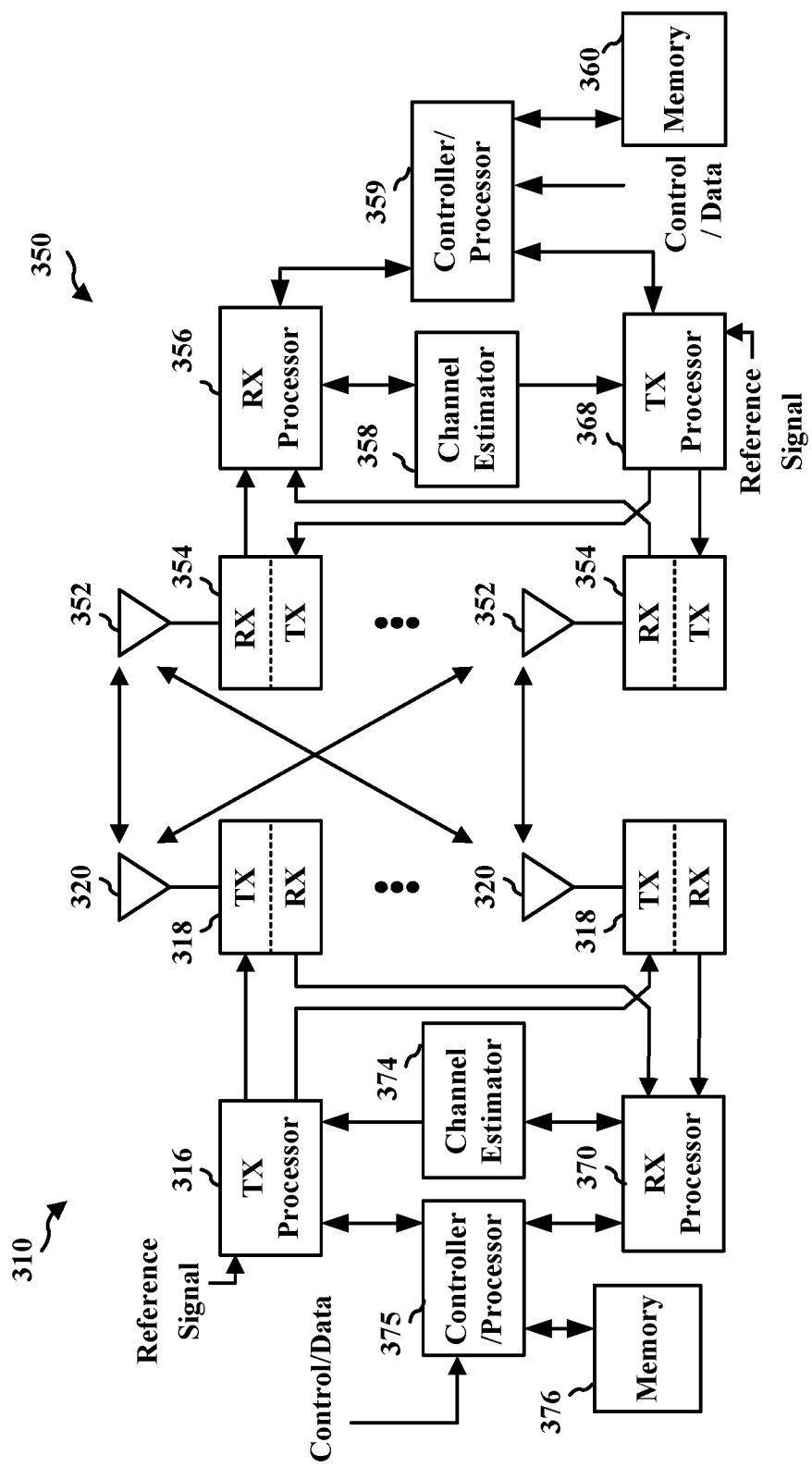
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communications include node operating channel heterogeneity, such as heterogeneous radio frequency (RF) bandwidths in an unlicensed spectrum. For instance, an unlicensed spectrum, e.g., around 60 GHz, may permit a deployment of nodes with a wide variety of bandwidths. Aggressor nodes with bandwidth heterogeneity may cause a frequency selective interference. Further, victim nodes with bandwidth heterogeneity may suffer a frequency selective interference.

Wireless communications may also include serving cell bandwidth heterogeneity. For instance, in new radio (NR) wireless communications, a base station and served UEs may use different bandwidths or bandwidth parts (BWPs) for operation on a single network operating channel. In some instances, there may be no common channelization. Also, non-NR victims and aggressors may use wider bands, e.g., 2.16 GHz.

Aspects of wireless communications may include bandwidth and sensing thresholds. For example, European telecommunications standards institute (ETSI) models for adaptivity may be around 60 GHz. An energy threshold $X_T(P_{out})$ may be a function of maximum equivalent isotropic radiated power (EIRP) $P_{out}$, e.g., for $P_{out}$ in dBm. Also, the following formula may be utilized for the threshold: $X_T(P_{out}) = -47$ dBm+(40 dBm-$P_{out}$). This may also be independent of a bandwidth of the operating channel. Further, ETSI adaptivity for load-based equipment may be another frequency, e.g., at 5 GHz, assuming a transmission bandwidth B and EIRP $P_{out}$ in dBm. The following formula may also be utilized for the threshold: $X_T(P_{out}) = -73$ dBm+10*log 10(B)+(23 dBm-$P_{out}$). The threshold may also increase with a bandwidth contended for fixed EIRP $P_{out}$.

In NR-unlicensed (NR-U) in certain frequencies, e.g., 5 GHz, an NR-unlicensed sensing may be assumed to be performed in a channel of 20 MHz bandwidth in listen before talk (LBT) communication. This may occur at an energy detection (ED) threshold for transmitting at maximum power (max P). In some instances, there may be a fixed high threshold per 20 MHz in absence of other technologies, e.g., −52 dBm. Otherwise, the threshold may be determined as a function of channel bandwidth, e.g., an LBT bandwidth of 20 MHz, and an output power relationship.

Aspects of wireless communication may also include a contention slot busy determination by sensing. In LBT communications, a carrier sense unit at a contending node in an unlicensed band operation may determine whether a contention slot, e.g., 9 μs for sub-6 GHz or 5 μs for 60 GHz, is busy for a node. For instance, the carrier sense unit may determine if a sensed interference level quality metric, e.g., energy received, is a greater than a threshold. The energy may be measured over the bandwidth of an operating channel for sensing. The threshold may be a function of a power class, maximum transmit power, or EIRP.

Figure 4:
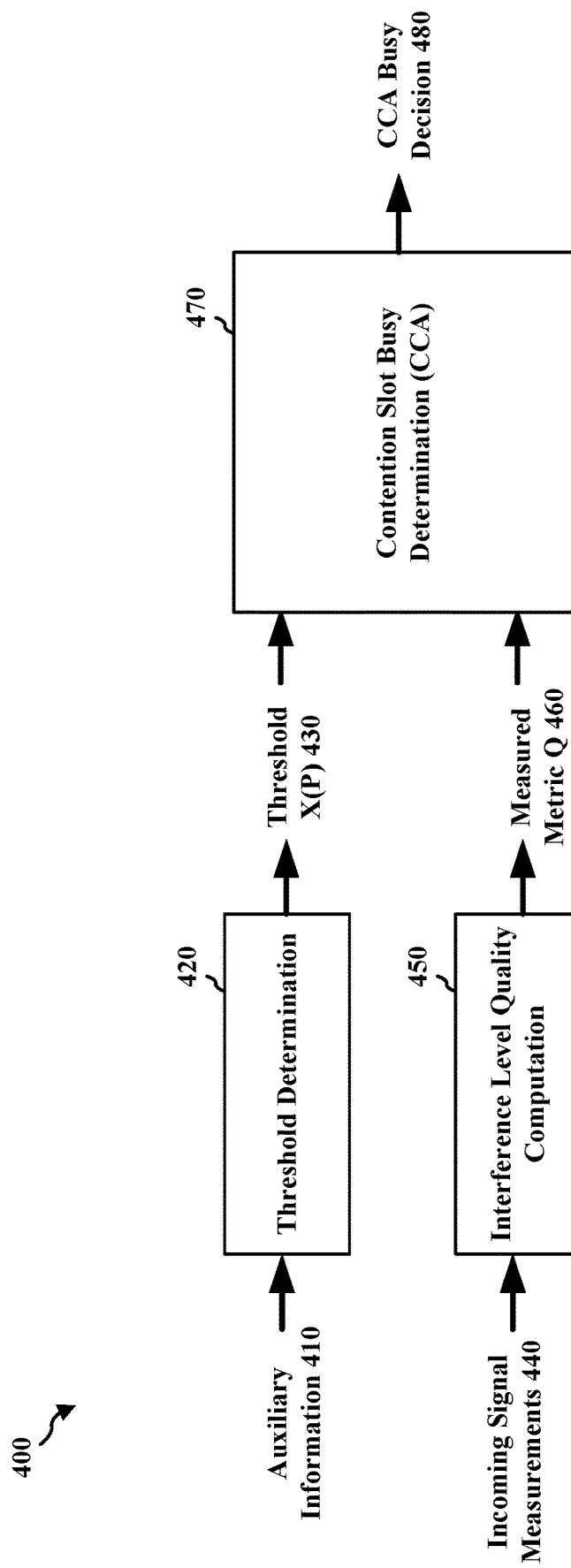
FIG. 4 is a diagram illustrating an example contention determination process in accordance with one or more techniques of the present disclosure.

FIG. 4 is a diagram 400 illustrating an example contention determination process. As shown in FIG. 4, diagram 400 includes auxiliary information 410, a threshold determination 420, a threshold 430, incoming signal measurements 440, an interference level quality computation 450, and a measured metric Q 460. Diagram 400 also includes a contention slot busy determination or clear channel assessment (CCA) 470 and a CCA busy decision 480.

As shown in FIG. 4, auxiliary information 410, e.g., bandwidth, power class, or transmit power, may be an input for a threshold determination 420. The threshold determination 420 may produce a threshold 430, i.e., X(P) 430. Also, an incoming signal measurement 440 may be an input to an interference level quality computation 450, e.g., an energy measurement, which may produce a measured metric Q 460, e.g., energy. The threshold X(P) 430 and the measured metric Q 460 may be utilized in a contention slot busy decision 470, e.g., a clear channel assessment (CCA) 470. This contention slot busy decision or CCA 470 may result in CCA busy decision 480. For example, CCA busy decision 480 may be a true or false answer depending on whether measured metric Q 460 is greater than or equal to threshold X(P) 430.

Additionally, there may be a schematic relationship between a heterogeneous operating channel, a sensing bandwidth, and a transmission bandwidth. A sensing bandwidth may be a bandwidth over which energy is measured to make a determination about channel access in an unlicensed or shared spectrum. For example, the smallest sensing bandwidth for Wi-Fi may be 20 MHz. For NR-U, the sensing bandwidth at a UE and a base station may be a multiple of an LBT bandwidth, e.g., 20 MHz.

Figures 5A, 5B:
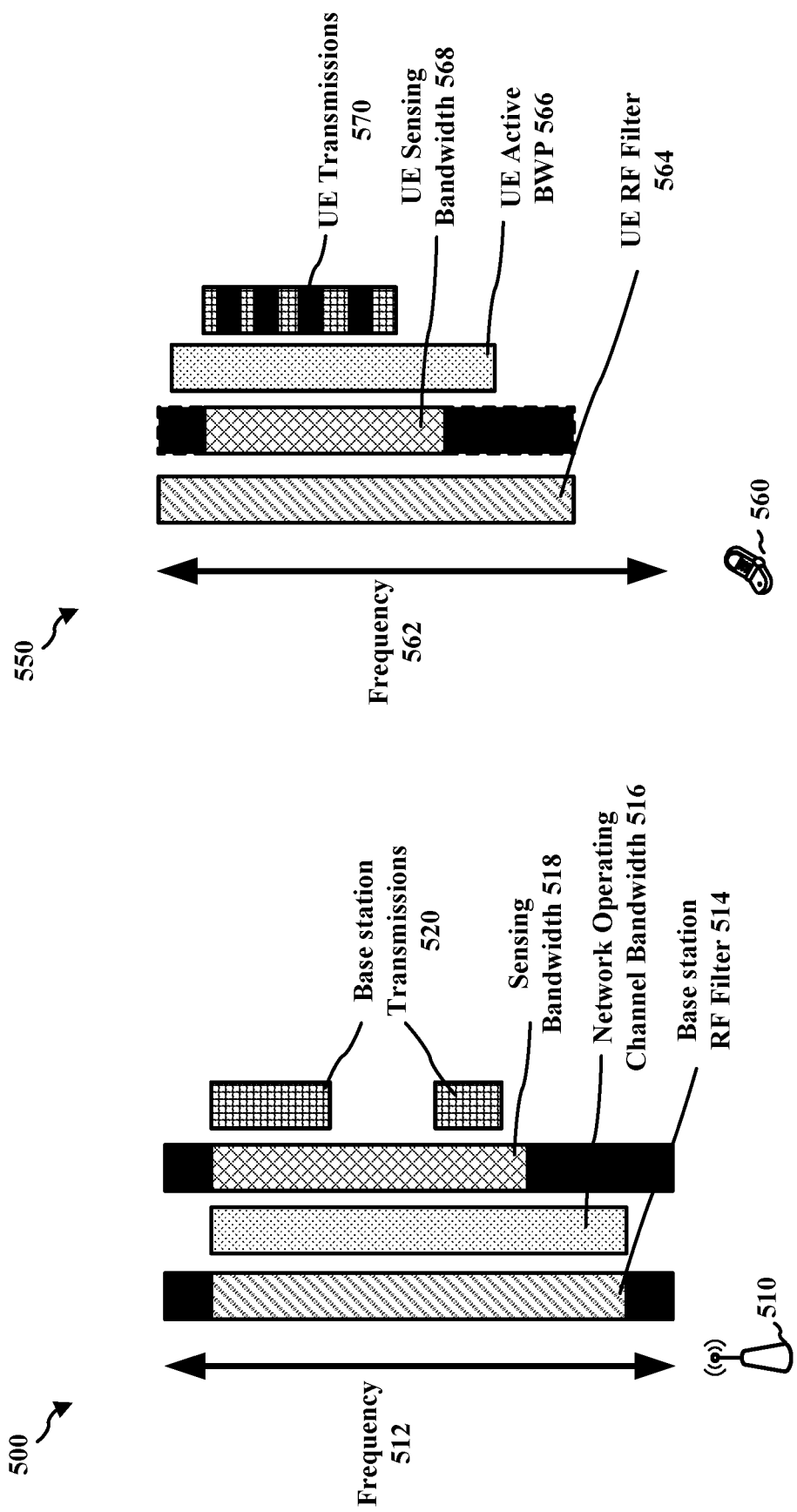
FIG. 5A is a diagram illustrating example transmissions of a base station in accordance with one or more techniques of the present disclosure.
FIG. 5B is a diagram illustrating example transmissions of a UE in accordance with one or more techniques of the present disclosure.

FIG. 5A is a diagram 500 illustrating transmissions of a base station 510. FIG. 5A displays a number of transmission bandwidths and communications at base station 510. As shown in FIG. 5A, diagram 500 includes base station 510, frequency 512, base station radio frequency (RF) filter 514, network operating channel bandwidth 516, sensing bandwidth 518, and base station transmissions 520. FIG. 5A shows that the base station transmissions 520 may be within the sensing bandwidth 518.

FIG. 5B is a diagram 550 illustrating transmissions of a UE 560. FIG. 5B displays a number of transmission bandwidths and communications at UE 560. As shown in FIG. 5B, diagram 550 includes a frequency 562, a UE RF filter 564, a UE active BWP 566, UE sensing bandwidth 568, and UE transmissions 570. FIG. 5B shows that the UE transmissions 570 may be within the UE sensing bandwidth 568.

As indicated herein, some aspects of wireless communications may not include the ability to dynamically select an operating channel bandwidth. As such, these transmissions may be inflexible regarding an operating bandwidth, and may not have the ability to select different bandwidths. Based on the above, it may be beneficial to provide dynamic operating channel bandwidths with adjusted energy detection thresholds. It may also be beneficial to provide a channel access scenario where a contending node may perform simultaneous energy detection decisions on multiple bandwidths and select an operating channel bandwidth dynamically.

Aspects of the present disclosure may include dynamic operating channel bandwidths with adjusted energy detection thresholds. For instance, aspects of the present disclosure may include a channel access scenario where a contending node may perform simultaneous energy detection decisions on multiple bandwidths and select an operating channel bandwidth dynamically. For a given value, a maximum transmit power adjustment or EIRP adjustment may be applied to an energy detection threshold as a function of bandwidths used for contention. Aspects of the present disclosure may utilize this dynamic bandwidth selection in a contention determination process.

Aspects of the present disclosure may also include an adaptive operating channel with an energy threshold adjustment. For instance, a bandwidth to occupy may be dynamically selected per contention by multiple simultaneous sensing operations. So aspects of the present disclosure may be adaptive to certain channels and bandwidths over a period of time. For example, aspects of the present disclosure may determine or dynamically select an occupying bandwidth, and then compare this bandwidth against an energy threshold in order to determine if a transmission medium is available.

In some instances, aspects of the present disclosure may include a sensing operation over candidate operating bandwidths. The candidate operating bandwidths may be sensed or measured for a fixed $P_{out}$, which may represent a maximum EIRP or transmit power. Additionally, a contending node may perform channel sensing over candidate operating channels with multiple bandwidths simultaneously. The sensed or measured set of frequencies or bandwidths may be overlapping or non-overlapping. Based on the sensing or measuring, an operating bandwidth or frequency may be selected. Further, a potentially different energy detection threshold may be applied for each of the sensed measurements to make separate CCA decisions for a radiating $P_{out}$. The transmission medium may not be occupied for any operating channel where the CCA results in a certain decision, e.g., a 'medium busy' decision.

Figure 6A:
FIG. 6A is a graph illustrating a reference threshold compared to an operating channel bandwidth in accordance with one or more techniques of the present disclosure.

FIG. 6A is a graph 600 illustrating a reference threshold, e.g., threshold X 602, compared to an operating channel bandwidth 604. FIG. 6A displays that graph 600 includes an adaptive operating channel including a matched sensing case for a fixed $P_{out}$ 610. As shown in FIG. 6A, graph 600 includes a threshold X 602 against a sensing bandwidth or operating channel bandwidth 604. Graph 600 also includes ETSI frequencies, e.g., ETSI 5 GHz NRU 606 and ETSI 60 GHz 608.

Figure 6B:
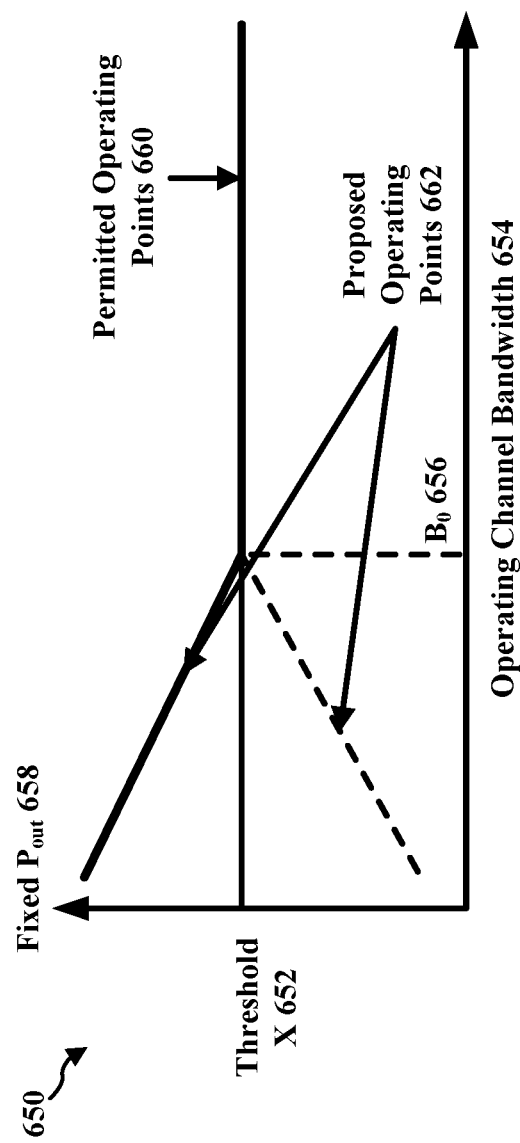
FIG. 6B is a graph illustrating a reference threshold compared to an operating channel bandwidth in accordance with one or more techniques of the present disclosure.

FIG. 6B is a graph 650 illustrating a reference threshold, e.g., threshold X 652, compared to an operating channel bandwidth 654. FIG. 6B also shows a graph of a threshold X 652 against a sensing bandwidth or operating channel bandwidth 654, which includes a fixed $P_{out}$ 658, permitted operating points 660, and proposed operating points 662. For instance, each frequency to the right of $B_0$ 656 may be permitted, while each frequency to the left of $B_0$ 656 may not be permitted. Also, the threshold X 652 may be a number of different patterns, such as a descending pattern or an ascending pattern.

In some instances, subband sensing may be performed over a contended bandwidth. For example, if one subband is occupied, and there may be increased efficiency on another subband, then it may be beneficial to measure and select an operating bandwidth. In some aspects, an adaptive operating channel may permit occupancy of free resource blocks (RBs) with full power dynamically. For example, the adaptive operating channel may occupy a number of frequencies, e.g., 100, 200, or 400 MHz, with $P_{out}$ utilizing frequency adaptive thresholds.

In some instances, aspects of the present disclosure may encourage narrowband interference, such as effective data capacity at a victim node. Further, aspects of the present disclosure may encourage wideband interference, e.g., signal-to-interference plus noise (SINR) friendly interference for victim node control transmissions. Also, aspects of the present disclosure may be combined with adaptive power in order to identify an optimal tuple of a number of components, e.g., free subbands and/or transmit (Tx) power spectral density (PSD).

Aspects of the present disclosure may define a reference bandwidth, $B_0$, or a reference threshold, $X_0(B_0, P_T)$, expressed in dBm. As indicated above, the sensing bandwidth may be larger than an operating bandwidth or a transmission bandwidth. The reference bandwidth may be used as a reference to determine whether a transmission medium is available for transmission. In some aspects, the reference bandwidth may be a part of a quantized set of reference bandwidths that are used to compute an energy threshold. Also, $P_T$ may represent a static or semi-static version of transmit power. For example, $P_T$ may represent a maximum EIRP permitted for a device class or a transmit power class.

Aspects of the present disclosure may include a threshold that is adjusted for a candidate operating channel bandwidth. For example, $X_{Thresh}=X_0(B_0, P_T)+f(B_i, B_0)$, where $X_{Thresh}$ is an adjusted energy threshold, $B_0$ is the reference bandwidth, $P_T$ is the transmit power, $X_0$ is the reference threshold, $B_i$ is the candidate operating channel bandwidth, and $f(B_i, B_0)$ is the threshold adjustment. Aspects of the present disclosure may include a number of options for the threshold adjustment.

Figure 7:
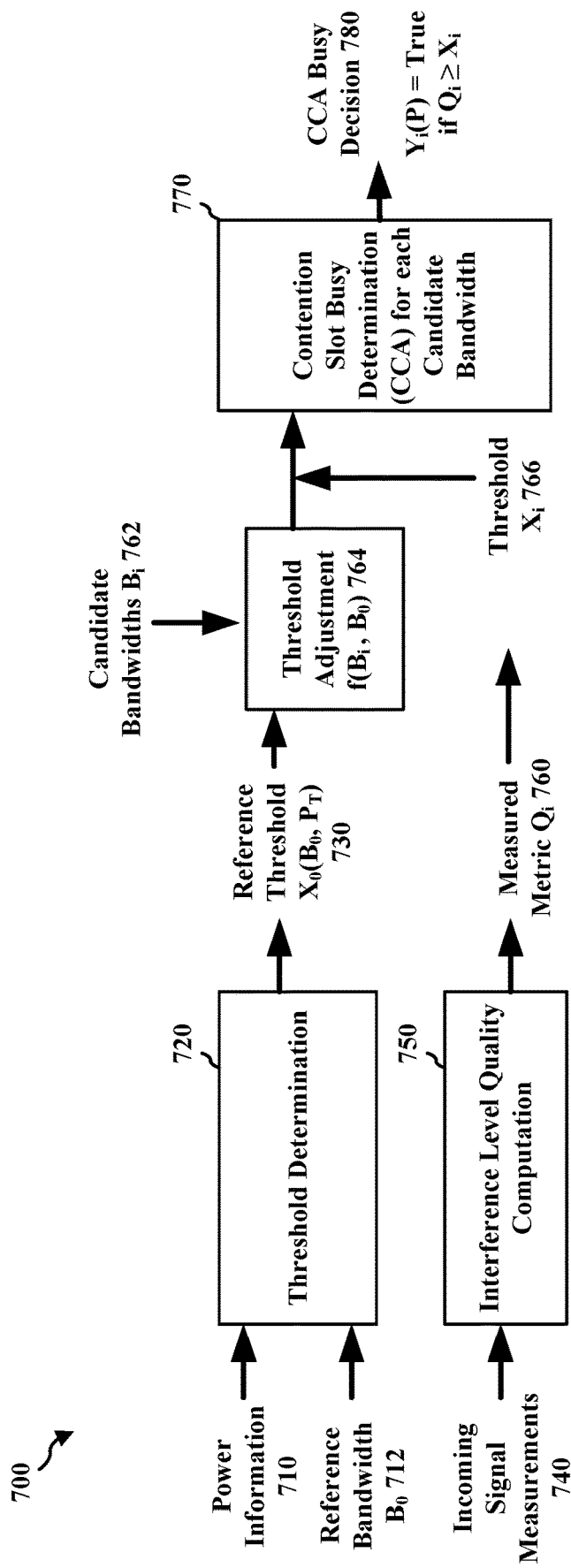
FIG. 7 is a diagram illustrating an example contention determination process in accordance with one or more techniques of the present disclosure.

FIG. 7 is a diagram 700 illustrating an example contention determination process. As shown in FIG. 7, diagram 700 includes power information 710, reference bandwidth 712, a threshold determination 720, a reference threshold $X_0$ 730, incoming signal measurements 740, an interference level quality computation 750, a measured metric $Q_i$ 760, one or more candidate bandwidths $B_i$ 762, threshold adjustment 764, and a threshold $X_i$ 766. Diagram 700 also includes a contention slot busy determination or clear channel assessment (CCA) 770, e.g., for each candidate bandwidth, and a CCA busy decision 780.

As shown in FIG. 7, a reference bandwidth $B_0$ 712 and power information 710, e.g., power class and maximum transmit power, may be an input for threshold determination 720, which may produce a reference threshold 730, i.e., reference threshold $X_0(B_0, P_T)$. This reference threshold 730, along with a candidate bandwidth $B_i$ 762, may produce a threshold adjustment 764, e.g., $f(B_i, B_0)$. So a candidate bandwidth 762 may be used in conjunction with the reference bandwidth 712 to subsequently adjust the energy threshold, e.g., via threshold adjustment 764, which may correspond to threshold $X_i$ 766. In some aspects, the reference bandwidth 712 may be greater than or equal to the candidate bandwidth 762.

FIG. 7 shows that incoming signal measurements 740 may be an input to an interference level quality computation 750, e.g., an energy measurement, which may produce a measured metric $Q_i$ 760, e.g., energy. The measured metric $Q_i$ 760 and threshold $X_i$ 766 may be utilized in a contention slot busy determination 770, e.g., a clear channel assessment (CCA) 770, which may be determined for each candidate bandwidth. This contention slot busy determination or CCA 770 may result in CCA busy decision 780. The CCA busy decision 780 may be a true or false answer depending on if metric $Q_i$ 760 is greater than or equal to threshold $X_i$ 766.

As shown in FIG. 7, the reference threshold, along with a candidate bandwidth $B_i$, may produce a threshold adjustment, e.g., $f(B_i, B_0)$. So the sensing bandwidth or candidate bandwidth may be used in conjunction with the reference bandwidth to subsequently adjust the energy threshold. In some aspects, the reference bandwidth may be greater than or equal to the sensing bandwidth or candidate bandwidth. Further, the sensing node, e.g., a UE or base station, may measure multiple candidate bandwidths, and then dynamically select an operating bandwidth. The sensing node may then determine whether a transmission medium is available on the operating bandwidth. Also, incoming signal measurements may be an input to an interference level quality computation, e.g., an energy measurement, which may produce a measured metric $Q_i$, e.g., energy. The threshold adjustment and the measured metric $Q_i$ may be utilized in a contention slot busy decision, e.g., a clear channel assessment (CCA). This contention slot busy decision or CCA may result in a true or false answer depending on whether $Q_i$ is greater than or equal to $X_i$.

FIGS. 8A, 8B, 8C, 8D, and 8E are graphs 800, 820, 840, 860, and 880, respectively, illustrating a reference threshold compared to an operating channel bandwidth. As shown in FIGS. 8A-8E, aspects of the present disclosure may include a number of options for threshold adjustments. For instance, aspects of the present disclosure may include threshold adjustments for a given maximum EIRP. As indicated above, a sensing bandwidth may correspond to an operating channel bandwidth that has been measured or sensed. FIGS. 8A-8E display an operating channel bandwidth, which may be dynamically determined by a sensing node, e.g., a UE or base station. So sensing nodes that may not be working together may determine or select the operating bandwidth in an efficient manner.

FIG. 8A is a graph 800 illustrating a reference threshold 802 (dBm) compared to an operating channel bandwidth 804 (log scale), which also includes reference bandwidth $B_0$ 806. As shown in FIG. 8A, the threshold $X_0(B_0, P_T)$ 808 may be increased as the operating channel bandwidth 804 increases. For example, $$X_{Thresh} = X_0(B_0, P_T) + 10 \log10\left(\frac{B_i}{B0}\right).$$

This function may promote channel access for nodes that sense a wider bandwidth. For instance, when the energy threshold increases, the availability of the transmission medium may likewise increase.

FIG. 8B is a graph 820 illustrating a reference threshold 822 (dBm) compared to an operating channel bandwidth 824 (log scale), which also includes reference bandwidth $B_0$ 826.

As shown in FIG. 8B, the threshold $X_0(B_0, P_T)$ 828 may be decreased as the operating channel bandwidth 824 increases. For example, $$X_{Thresh} = X_0(B_0, P_T) - 10 \log10\left(\frac{B_i}{B0}\right).$$

This function may encourage nodes to sense and transmit on narrower bandwidths. So this function may promote the nodes to occupy a reduced amount of bandwidth, in order to increase the amount of nodes that may utilize the medium. This may correspond to use cases that utilize smaller bandwidths.

FIG. 8C is a graph 840 illustrating a reference threshold 842 (dBm) compared to an operating channel bandwidth 844 (log scale), which also includes reference bandwidth $B_0$ 846. As shown in FIG. 8C, threshold $X_0(B_0, P_T)$ 848 may be a monotonic, non-increasing function with lower clipping. For instance, the energy detection threshold 848 may be a non-increasing function with a minimum threshold. For example, $$X_{Thresh} = X_0(B_0, P_T) + f_1\left(\frac{B_i}{B_0}\right).$$

This function may promote channel access for operating channel bandwidths lower than $B_0$.

FIG. 8D is a graph 860 illustrating a reference threshold 862 (dBm) compared to an operating channel bandwidth 864 (log scale), which also includes reference bandwidth $B_0$ 866. As shown in FIG. 8D, threshold $X_0(B_0, P_T)$ 868 may be a monotonic, non-decreasing function of an operating channel bandwidth, e.g., with upper clipping. For instance, the energy detection threshold 868 may be a non-decreasing function with a maximum threshold. For example, $$X_{Thresh} = X_0(B_0, P_T) + f_2\left(\frac{B_i}{B_0}\right).$$

This function may promote channel access for operating channel bandwidths larger than $B_0$.

FIG. 8E is a graph 880 illustrating a reference threshold 882 (dBm) compared to an operating channel bandwidth 884 (log scale), which also includes reference bandwidth $B_0$ 886. As shown in FIG. 8E, threshold $X_0(B_0, P_T)$ 888 may be a function with single peak for an operating channel bandwidth. For instance, the energy detection threshold 888 may increase prior to a peak value, and the energy detection threshold 888 may decrease after the peak value. For example, $$X_{Thresh} = X_0(B_0, P_T) + f_3\left(\frac{B_i}{B_0}\right).$$

This function may encourage the use of an operating channel bandwidth equal to $B_0$, as well as be a way to accomplish decentralized agreements for operating channel bandwidths.

Moreover, aspects of the present disclosure may include a function with a single valley for an operating channel bandwidth. For instance, the energy detection threshold may decrease prior to a minimum value, and the energy detection threshold may increase after the minimum value.

Figure 9:
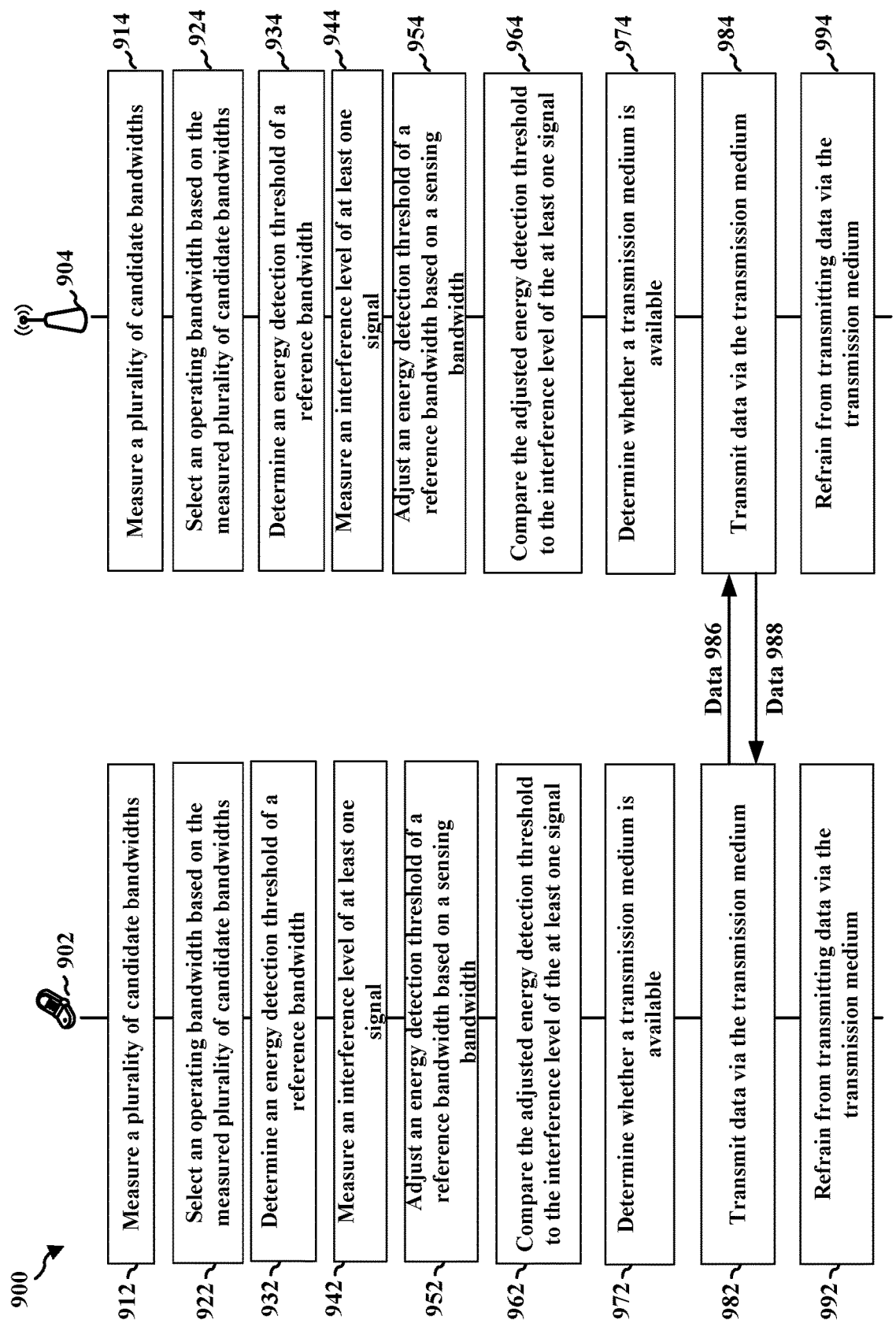
FIG. 9 is a diagram illustrating example communication between a UE and a base station in accordance with one or more techniques of the present disclosure.

FIG. 9 is a diagram 900 illustrating example communication between a UE 902 and a base station 904.

At 912, UE 902 may measure one or more candidate bandwidths, each of the one or more candidate bandwidths corresponding to a candidate channel. At 914, base station 904 may measure one or more candidate bandwidths, each of the one or more candidate bandwidths corresponding to a candidate channel. The one or more candidate bandwidths may be a plurality of candidate bandwidths.

At 922, UE 902 may select an operating bandwidth of the one or more candidate bandwidths based on the measured one or more candidate bandwidths, the operating bandwidth corresponding to an operating channel. At 924, base station 904 may select an operating bandwidth of the one or more candidate bandwidths based on the measured one or more candidate bandwidths, the operating bandwidth corresponding to an operating channel. In some aspects, the operating bandwidth may correspond to a sensing bandwidth.

At 932, UE 902 may determine an energy detection threshold of a reference bandwidth, the energy detection threshold being based on at least one of a transmit power or a power class. At 934, base station 904 may determine an energy detection threshold of a reference bandwidth, the energy detection threshold being based on at least one of a transmit power or a power class.

At 942, UE 902 may measure an interference level of at least one signal, where a determination whether a transmission medium is available is based on the measured interference level. At 944, base station 904 may measure an interference level of at least one signal, where a determination whether a transmission medium is available is based on the measured interference level.

At 952, UE 902 may adjust an energy detection threshold of a reference bandwidth based on the selected operating bandwidth. At 954, base station 904 may adjust an energy detection threshold of a reference bandwidth based on the selected operating bandwidth.

At 962, UE 902 may compare the adjusted energy detection threshold to the interference level of the at least one signal. At 964, base station 904 may compare the adjusted energy detection threshold to the interference level of the at least one signal.

In some aspects, the energy detection threshold may be increased when the operating bandwidth increases. Also, the energy detection threshold may be decreased when the operating bandwidth increases. The energy detection threshold may correspond to a non-increasing function with a minimum threshold. The energy detection threshold may also correspond to a non-decreasing function with a maximum threshold. Further, the energy detection threshold may increase prior to a peak value, and the energy detection threshold may decrease after the peak value.

At 972, UE 902 may determine whether a transmission medium is available based on at least one of the adjusted energy detection threshold or an interference level of at least one signal. At 974, base station 904 may determine whether a transmission medium is available based on at least one of the adjusted energy detection threshold or an interference level of at least one signal. In some aspects, the transmission medium may be available when the interference level of the at least one signal is less than the adjusted energy detection threshold. Also, the transmission medium may correspond to one or more transmission slots, and the interference level of the at least one signal may correspond to one or more contention slots.

At 982, UE 902 may transmit data, e.g., data 986, via the transmission medium when the interference level of the at least one signal is less than the adjusted energy detection threshold. At 984, base station 904 may transmit data, e.g., data 988, via the transmission medium when the interference level of the at least one signal is less than the adjusted energy detection threshold.

At 992, UE 902 may refrain from transmitting data via the transmission medium when the interference level of the at least one signal is greater than or equal to the adjusted energy detection threshold. At 994, base station 904 may refrain from transmitting data via the transmission medium when the interference level of the at least one signal is greater than or equal to the adjusted energy detection threshold.

Figure 10:
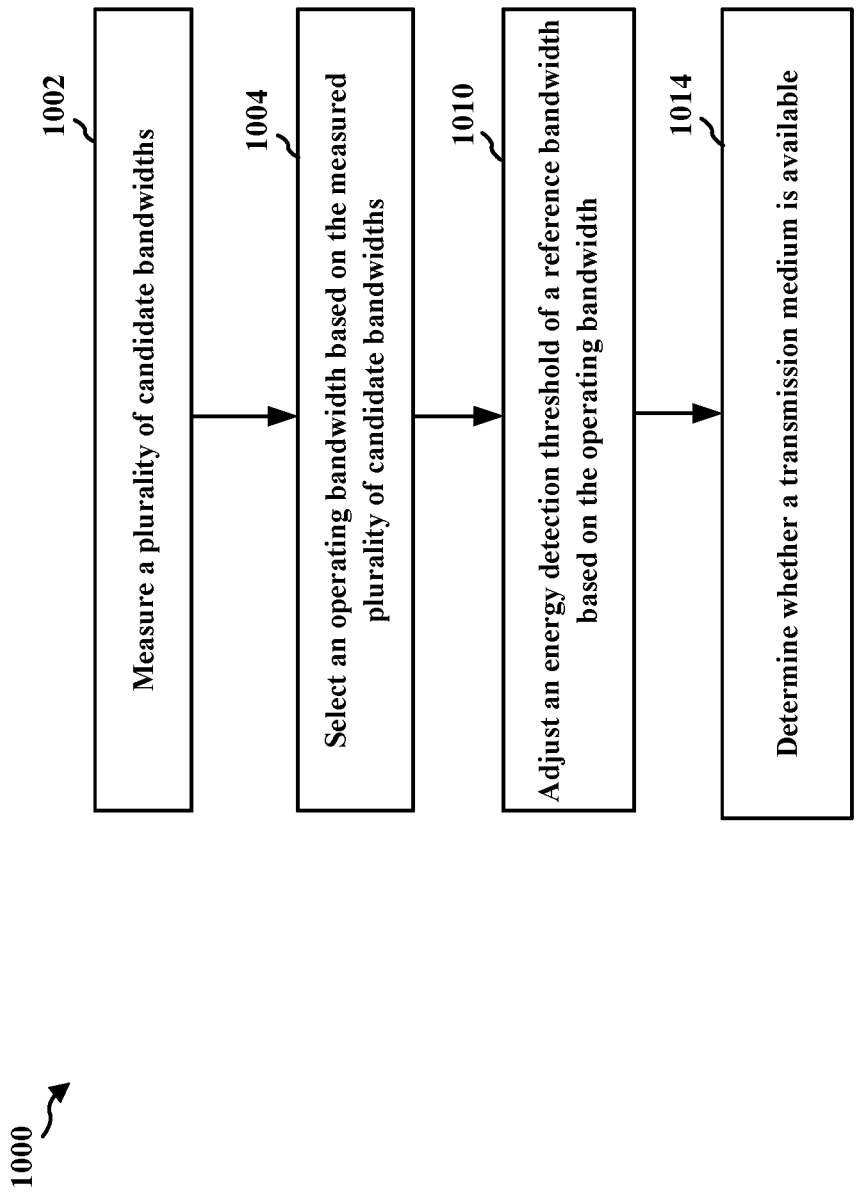
FIG. 10 is a flowchart of a method of wireless communication.

FIG. 10 is a flowchart 1000 of a method of wireless communication. The method may be performed by a UE or a component of a UE (e.g., the UE 104, 350, 902; the apparatus 1402; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 1002, the apparatus may measure one or more candidate bandwidths, each of the one or more candidate bandwidths corresponding to a candidate channel, as described in connection with the examples in FIGS. 4, 5A, 5B, 6A, 6B, 7, 8A-8E, and 9. For example, UE 902 may measure one or more candidate bandwidths, each of the one or more candidate bandwidths corresponding to a candidate channel, as described in connection with 912 in FIG. 9. Further, 1002 may be performed by determination component 1440 in FIG. 14. The one or more candidate bandwidths may be a plurality of candidate bandwidths.

At 1004, the apparatus may select an operating bandwidth of the one or more candidate bandwidths based on the measured one or more candidate bandwidths, the operating bandwidth corresponding to an operating channel, as described in connection with the examples in FIGS. 4, 5A, 5B, 6A, 6B, 7, 8A-8E, and 9. For example, UE 902 may select an operating bandwidth of the one or more candidate bandwidths based on the measured one or more candidate bandwidths, the operating bandwidth corresponding to an operating channel, as described in connection with 922 in FIG. 9. Further, 1004 may be performed by determination component 1440 in FIG. 14. In some aspects, the operating bandwidth may correspond to a sensing bandwidth.

At 1010, the apparatus may adjust an energy detection threshold of a reference bandwidth based on the selected operating bandwidth, as described in connection with the examples in FIGS. 4, 5A, 5B, 6A, 6B, 7, 8A-8E, and 9. For example, UE 902 may adjust an energy detection threshold of a reference bandwidth based on the selected operating bandwidth, as described in connection with 952 in FIG. 9. Further, 1010 may be performed by determination component 1440 in FIG. 14.

In some aspects, the energy detection threshold may be increased when the operating bandwidth increases. Also, the energy detection threshold may be decreased when the operating bandwidth increases. The energy detection threshold may correspond to a non-increasing function with a minimum threshold. The energy detection threshold may also correspond to a non-decreasing function with a maximum threshold. Further, the energy detection threshold may increase prior to a peak value, and the energy detection threshold may decrease after the peak value.

At 1014, the apparatus may determine whether a transmission medium is available based on at least one of the adjusted energy detection threshold or an interference level of at least one signal, as described in connection with the examples in FIGS. 4, 5A, 5B, 6A, 6B, 7, 8A-8E, and 9. For example, UE 902 may determine whether a transmission medium is available based on at least one of the adjusted energy detection threshold or an interference level of at least one signal, as described in connection with 972 in FIG. 9. Further, 1014 may be performed by determination component 1440 in FIG. 14. In some aspects, the transmission medium may correspond to one or more transmission slots, and the interference level of the at least one signal may correspond to one or more contention slots.

Figure 11:
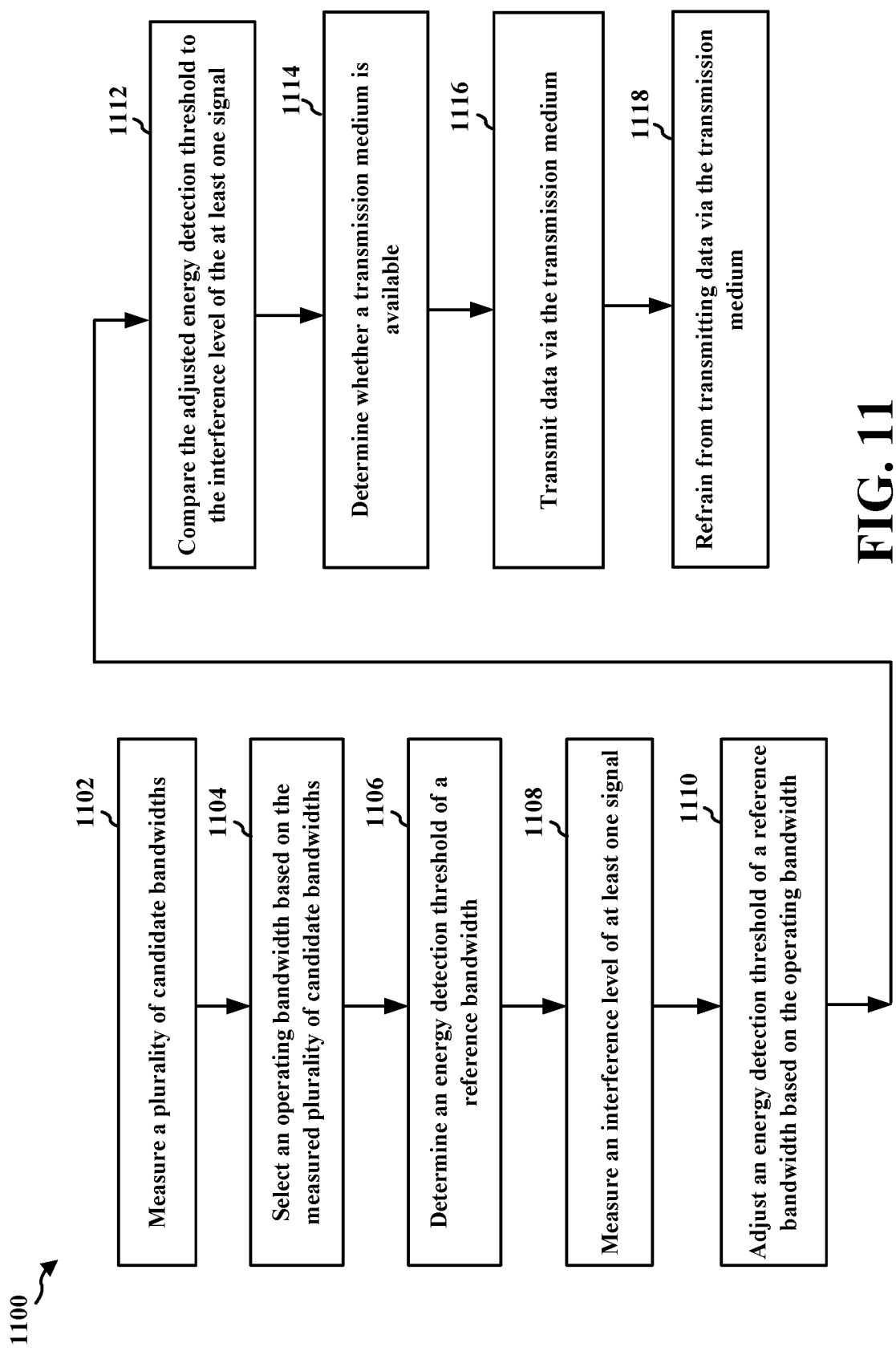
FIG. 11 is a flowchart of a method of wireless communication.

FIG. 11 is a flowchart 1100 of a method of wireless communication. The method may be performed by a UE or a component of a UE (e.g., the UE 104, 350, 902; the apparatus 1402; a processing system, which may include the memory 360 and which may be the entire UE or a component of the UE, such as the TX processor 368, the controller/processor 359, transmitter 354TX, antenna(s) 352, and/or the like). The methods described herein may provide a number of benefits, such as improving communication signaling, resource utilization, and/or power savings.

At 1102, the apparatus may measure one or more candidate bandwidths, each of the one or more candidate bandwidths corresponding to a candidate channel, as described in connection with the examples in FIGS. 4, 5A, 5B, 6A, 6B, 7, 8A-8E, and 9. For example, UE 902 may measure one or more candidate bandwidths, each of the one or more candidate bandwidths corresponding to a candidate channel, as described in connection with 912 in FIG. 9. Further, 1102 may be performed by determination component 1440 in FIG. 14. The one or more candidate bandwidths may be a plurality of candidate bandwidths.

At 1104, the apparatus may select an operating bandwidth of the one or more candidate bandwidths based on the measured one or more candidate bandwidths, the operating bandwidth corresponding to an operating channel, as described in connection with the examples in FIGS. 4, 5A, 5B, 6A, 6B, 7, 8A-8E, and 9. For example, UE 902 may select an operating bandwidth of the one or more candidate bandwidths based on the measured one or more candidate bandwidths, the operating bandwidth corresponding to an operating channel, as described in connection with 922 in FIG. 9. Further, 1104 may be performed by determination component 1440 in FIG. 14. In some aspects, the operating bandwidth may correspond to a sensing bandwidth.

At 1106, the apparatus may determine an energy detection threshold of a reference bandwidth, the energy detection threshold being based on at least one of a transmit power or a power class, as described in connection with the examples in FIGS. 4, 5A, 5B, 6A, 6B, 7, 8A-8E, and 9. For example, UE 902 may determine an energy detection threshold of a reference bandwidth, the energy detection threshold being based on at least one of a transmit power or a power class, as described in connection with 932 in FIG. 9. Further, 1106 may be performed by determination component 1440 in FIG. 14.

At 1108, the apparatus may measure an interference level of at least one signal, where a determination whether a transmission medium is available is based on the measured interference level, as described in connection with the examples in FIGS. 4, 5A, 5B, 6A, 6B, 7, 8A-8E, and 9. For example, UE 902 may measure an interference level of at least one signal, where a determination whether a transmission medium is available is based on the measured interference level, as described in connection with 942 in FIG. 9. Further, 1108 may be performed by determination component 1440 in FIG. 14.

At 1110, the apparatus may adjust an energy detection threshold of a reference bandwidth based on the selected operating bandwidth, as described in connection with the examples in FIGS. 4, 5A, 5B, 6A, 6B, 7, 8A-8E, and 9. For example, UE 902 may adjust an energy detection threshold of a reference bandwidth based on the selected operating bandwidth, as described in connection with 952 in FIG. 9. Further, 1110 may be performed by determination component 1440 in FIG. 14.

At 1112, the apparatus may compare the adjusted energy detection threshold to the interference level of the at least one signal, as described in connection with the examples in FIGS. 4, 5A, 5B, 6A, 6B, 7, 8A-8E, and 9. For example, UE 902 may compare the adjusted energy detection threshold to the interference level of the at least one signal, as described in connection with 962 in FIG. 9. Further, 1112 may be performed by determination component 1440 in FIG. 14. In some aspects, the transmission medium may be available when the interference level of the at least one signal is less than the adjusted energy detection threshold.

In some aspects, the energy detection threshold may be increased when the operating bandwidth increases. Also, the energy detection threshold may be decreased when the operating bandwidth increases. The energy detection threshold may correspond to a non-increasing function with a minimum threshold. The energy detection threshold may also correspond to a non-decreasing function with a maximum threshold. Further, the energy detection threshold may increase prior to a peak value, and the energy detection threshold may decrease after the peak value.

At 1114, the apparatus may determine whether a transmission medium is available based on at least one of the adjusted energy detection threshold or an interference level of at least one signal, as described in connection with the examples in FIGS. 4, 5A, 5B, 6A, 6B, 7, 8A-8E, and 9. For example, UE 902 may determine whether a transmission medium is available based on at least one of the adjusted energy detection threshold or an interference level of at least one signal, as described in connection with 972 in FIG. 9. Further, 1114 may be performed by determination component 1440 in FIG. 14. In some aspects, the transmission medium may correspond to one or more transmission slots, and the interference level of the at least one signal may correspond to one or more contention slots.

At 1116, the apparatus may transmit data via the transmission medium when the interference level of the at least one signal is less than the adjusted energy detection threshold, as described in connection with the examples in FIGS. 4, 5A, 5B, 6A, 6B, 7, 8A-8E, and 9. For example, UE 902 may transmit data via the transmission medium when the interference level of the at least one signal is less than the adjusted energy detection threshold, as described in connection with 982 in FIG. 9. Further, 1116 may be performed by determination component 1440 in FIG. 14.

At 1118, the apparatus may refrain from transmitting data via the transmission medium when the interference level of the at least one signal is greater than or equal to the adjusted energy detection threshold, as described in connection with the examples in FIGS. 4, 5A, 5B, 6A, 6B, 7, 8A-8E, and 9. For example, UE 902 may refrain from transmitting data via the transmission medium when the interference level of the at least one signal is greater than or equal to the adjusted energy detection threshold, as described in connection with 992 in FIG. 9. Further, 1118 may be performed by determination component 1440 in FIG. 14.

Figure 12:
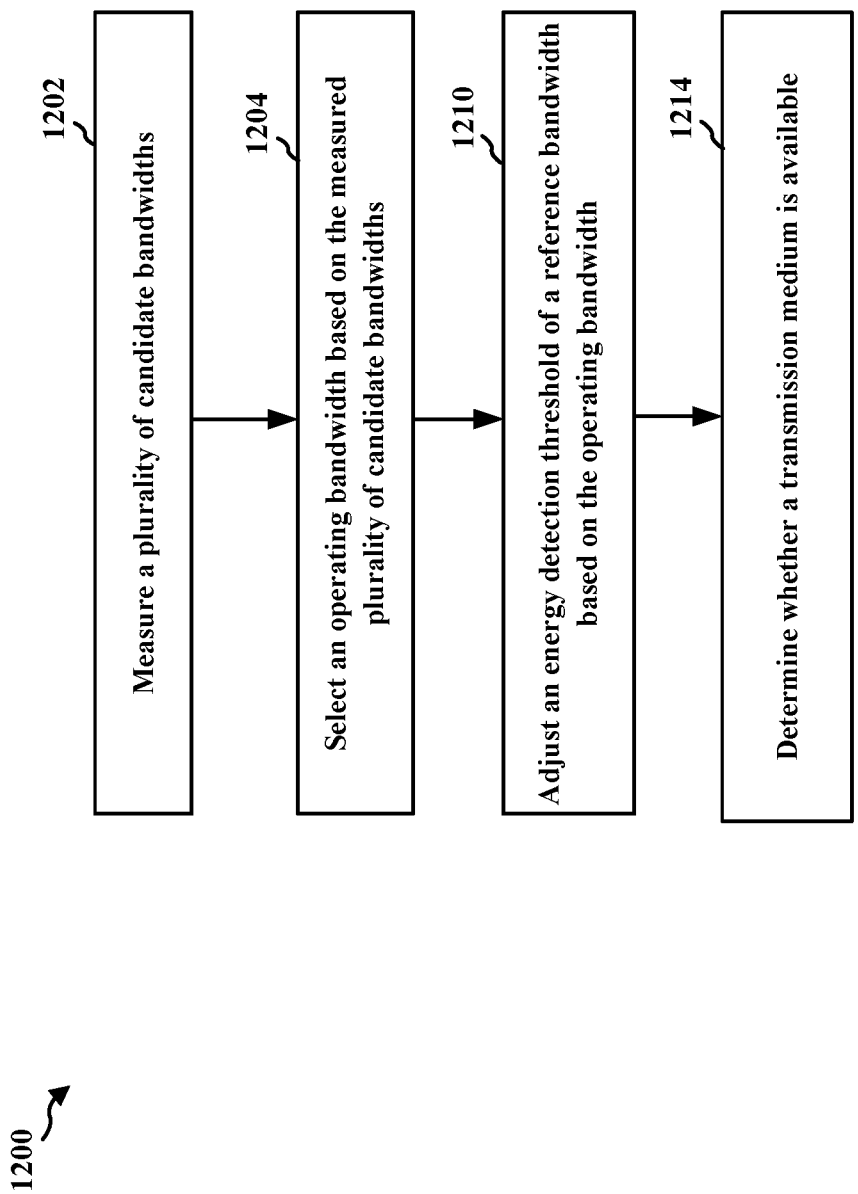
FIG. 12 is a flowchart of a method of wireless communication.

FIG. 12 is a flowchart 1200 of a method of wireless communication. The method may be performed by a base station or a component of a base station (e.g., the base station 102, 180, 310, 904; the apparatus 1502; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1202, the apparatus may measure one or more candidate bandwidths, each of the one or more candidate bandwidths corresponding to a candidate channel, as described in connection with the examples in FIGS. 4, 5A, 5B, 6A, 6B, 7, 8A-8E, and 9. For example, base station 904 may measure one or more candidate bandwidths, each of the one or more candidate bandwidths corresponding to a candidate channel, as described in connection with 914 in FIG. 9. Further, 1202 may be performed by determination component 1540 in FIG. 15. The one or more candidate bandwidths may be a plurality of candidate bandwidths.

At 1204, the apparatus may select an operating bandwidth of the one or more candidate bandwidths based on the measured one or more candidate bandwidths, the operating bandwidth corresponding to an operating channel, as described in connection with the examples in FIGS. 4, 5A, 5B, 6A, 6B, 7, 8A-8E, and 9. For example, base station 904 may select an operating bandwidth of the one or more candidate bandwidths based on the measured one or more candidate bandwidths, the operating bandwidth corresponding to an operating channel, as described in connection with 924 in FIG. 9. Further, 1204 may be performed by determination component 1540 in FIG. 15. In some aspects, the operating bandwidth may correspond to a sensing bandwidth.

At 1210, the apparatus may adjust an energy detection threshold of a reference bandwidth based on the selected operating bandwidth, as described in connection with the examples in FIGS. 4, 5A, 5B, 6A, 6B, 7, 8A-8E, and 9. For example, base station 904 may adjust an energy detection threshold of a reference bandwidth based on the selected operating bandwidth, as described in connection with 954 in FIG. 9. Further, 1210 may be performed by determination component 1540 in FIG. 15.

In some aspects, the energy detection threshold may be increased when the operating bandwidth increases. Also, the energy detection threshold may be decreased when the operating bandwidth increases. The energy detection threshold may correspond to a non-increasing function with a minimum threshold. The energy detection threshold may also correspond to a non-decreasing function with a maximum threshold. Further, the energy detection threshold may increase prior to a peak value, and the energy detection threshold may decrease after the peak value.

At 1214, the apparatus may determine whether a transmission medium is available based on at least one of the adjusted energy detection threshold or an interference level of at least one signal, as described in connection with the examples in FIGS. 4, 5A, 5B, 6A, 6B, 7, 8A-8E, and 9. For example, base station 904 may determine whether a transmission medium is available based on at least one of the adjusted energy detection threshold or an interference level of at least one signal, as described in connection with 974 in FIG. 9. Further, 1214 may be performed by determination component 1540 in FIG. 15. In some aspects, the transmission medium may correspond to one or more transmission slots, and the interference level of the at least one signal may correspond to one or more contention slots.

Figure 13:
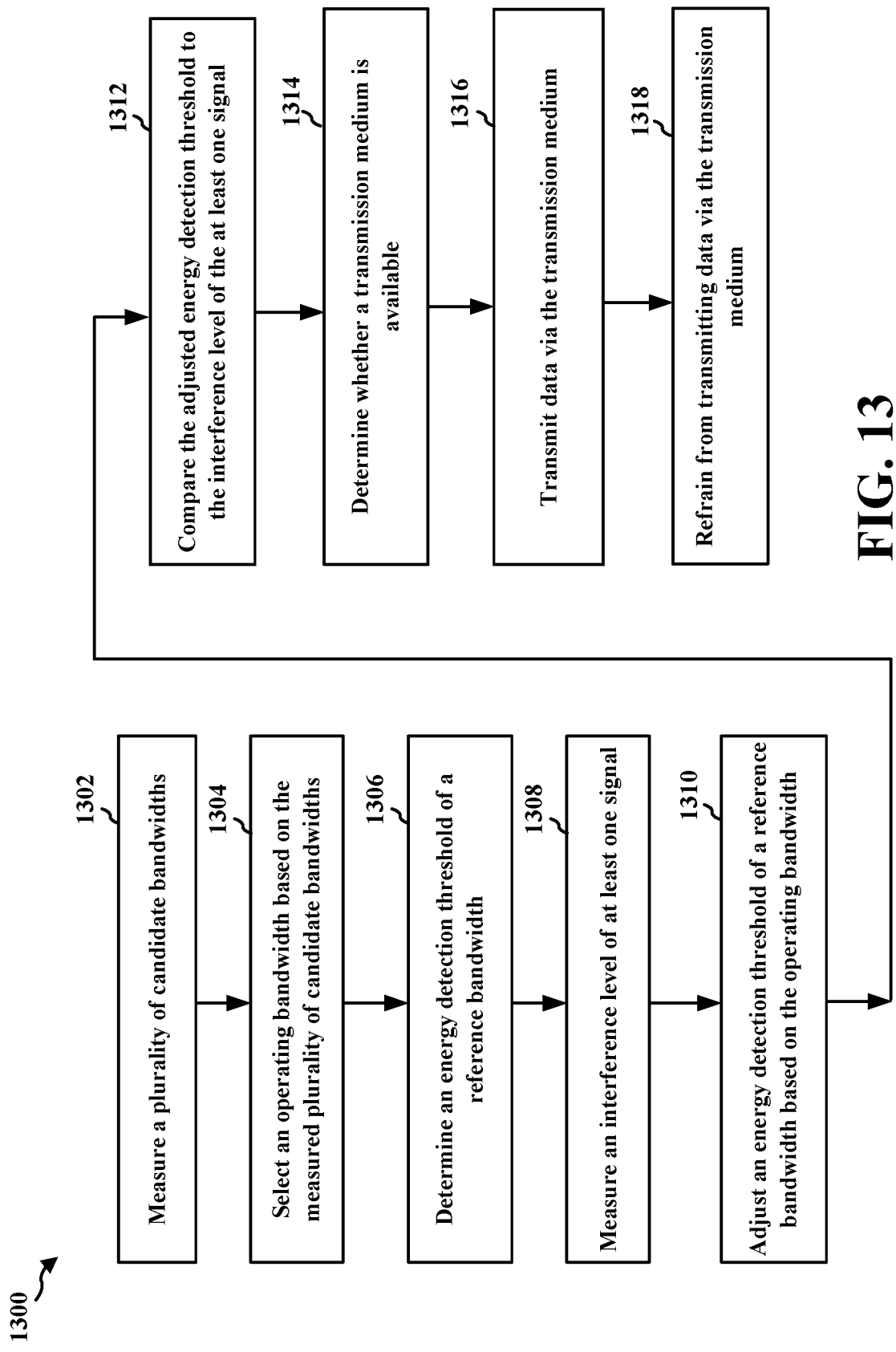
FIG. 13 is a flowchart of a method of wireless communication.

FIG. 13 is a flowchart 1300 of a method of wireless communication. The method may be performed by a base station or a component of a base station (e.g., the base station 102, 180, 310, 904; the apparatus 1502; a processing system, which may include the memory 376 and which may be the entire base station or a component of the base station, such as the antenna(s) 320, receiver 318RX, the RX processor 370, the controller/processor 375, and/or the like). The methods described herein may provide a number of benefits, such as improving communication signaling, resource utilization, and/or power savings.

At 1302, the apparatus may measure one or more candidate bandwidths, each of the one or more candidate bandwidths corresponding to a candidate channel, as described in connection with the examples in FIGS. 4, 5A, 5B, 6A, 6B, 7, 8A-8E, and 9. For example, base station 904 may measure one or more candidate bandwidths, each of the one or more candidate bandwidths corresponding to a candidate channel, as described in connection with 914 in FIG. 9. Further, 1302 may be performed by determination component 1540 in FIG. 15. The one or more candidate bandwidths may be a plurality of candidate bandwidths.

At 1304, the apparatus may select an operating bandwidth of the one or more candidate bandwidths based on the measured one or more candidate bandwidths, the operating bandwidth corresponding to an operating channel, as described in connection with the examples in FIGS. 4, 5A, 5B, 6A, 6B, 7, 8A-8E, and 9. For example, base station 904 may select an operating bandwidth of the one or more candidate bandwidths based on the measured one or more candidate bandwidths, the operating bandwidth corresponding to an operating channel, as described in connection with 924 in FIG. 9. Further, 1304 may be performed by determination component 1540 in FIG. 15. In some aspects, the operating bandwidth may correspond to a sensing bandwidth.

At 1306, the apparatus may determine an energy detection threshold of a reference bandwidth, the energy detection threshold being based on at least one of a transmit power or a power class, as described in connection with the examples in FIGS. 4, 5A, 5B, 6A, 6B, 7, 8A-8E, and 9. For example, base station 904 may determine an energy detection threshold of a reference bandwidth, the energy detection threshold being based on at least one of a transmit power or a power class, as described in connection with 934 in FIG. 9. Further, 1306 may be performed by determination component 1540 in FIG. 15.

At 1308, the apparatus may measure an interference level of at least one signal, where a determination whether a transmission medium is available is based on the measured interference level, as described in connection with the examples in FIGS. 4, 5A, 5B, 6A, 6B, 7, 8A-8E, and 9. For example, base station 904 may measure an interference level of at least one signal, where a determination whether a transmission medium is available is based on the measured interference level, as described in connection with 944 in FIG. 9. Further, 1308 may be performed by determination component 1540 in FIG. 15.

At 1310, the apparatus may adjust an energy detection threshold of a reference bandwidth based on the selected operating bandwidth, as described in connection with the examples in FIGS. 4, 5A, 5B, 6A, 6B, 7, 8A-8E, and 9. For example, base station 904 may adjust an energy detection threshold of a reference bandwidth based on the selected operating bandwidth, as described in connection with 954 in FIG. 9. Further, 1310 may be performed by determination component 1540 in FIG. 15.

At 1312, the apparatus may compare the adjusted energy detection threshold to the interference level of the at least one signal, as described in connection with the examples in FIGS. 4, 5A, 5B, 6A, 6B, 7, 8A-8E, and 9. For example, base station 904 may compare the adjusted energy detection threshold to the interference level of the at least one signal, as described in connection with 964 in FIG. 9. Further, 1312 may be performed by determination component 1540 in FIG. 15. In some aspects, the transmission medium may be available when the interference level of the at least one signal is less than the adjusted energy detection threshold.

In some aspects, the energy detection threshold may be increased when the operating bandwidth increases. Also, the energy detection threshold may be decreased when the operating bandwidth increases. The energy detection threshold may correspond to a non-increasing function with a minimum threshold. The energy detection threshold may also correspond to a non-decreasing function with a maximum threshold. Further, the energy detection threshold may increase prior to a peak value, and the energy detection threshold may decrease after the peak value.

At 1314, the apparatus may determine whether a transmission medium is available based on at least one of the adjusted energy detection threshold or an interference level of at least one signal, as described in connection with the examples in FIGS. 4, 5A, 5B, 6A, 6B, 7, 8A-8E, and 9. For example, base station 904 may determine whether a transmission medium is available based on at least one of the adjusted energy detection threshold or an interference level of at least one signal, as described in connection with 974 in FIG. 9. Further, 1314 may be performed by determination component 1540 in FIG. 15. In some aspects, the transmission medium may correspond to one or more transmission slots, and the interference level of the at least one signal may correspond to one or more contention slots.

At 1316, the apparatus may transmit data via the transmission medium when the interference level of the at least one signal is less than the adjusted energy detection threshold, as described in connection with the examples in FIGS. 4, 5A, 5B, 6A, 6B, 7, 8A-8E, and 9. For example, base station 904 may transmit data via the transmission medium when the interference level of the at least one signal is less than the adjusted energy detection threshold, as described in connection with 984 in FIG. 9. Further, 1316 may be performed by determination component 1540 in FIG. 15.

At 1318, the apparatus may refrain from transmitting data via the transmission medium when the interference level of the at least one signal is greater than or equal to the adjusted energy detection threshold, as described in connection with the examples in FIGS. 4, 5A, 5B, 6A, 6B, 7, 8A-8E, and 9. For example, base station 904 may refrain from transmitting data via the transmission medium when the interference level of the at least one signal is greater than or equal to the adjusted energy detection threshold, as described in connection with 994 in FIG. 9. Further, 1318 may be performed by determination component 1540 in FIG. 15.

Figure 14:
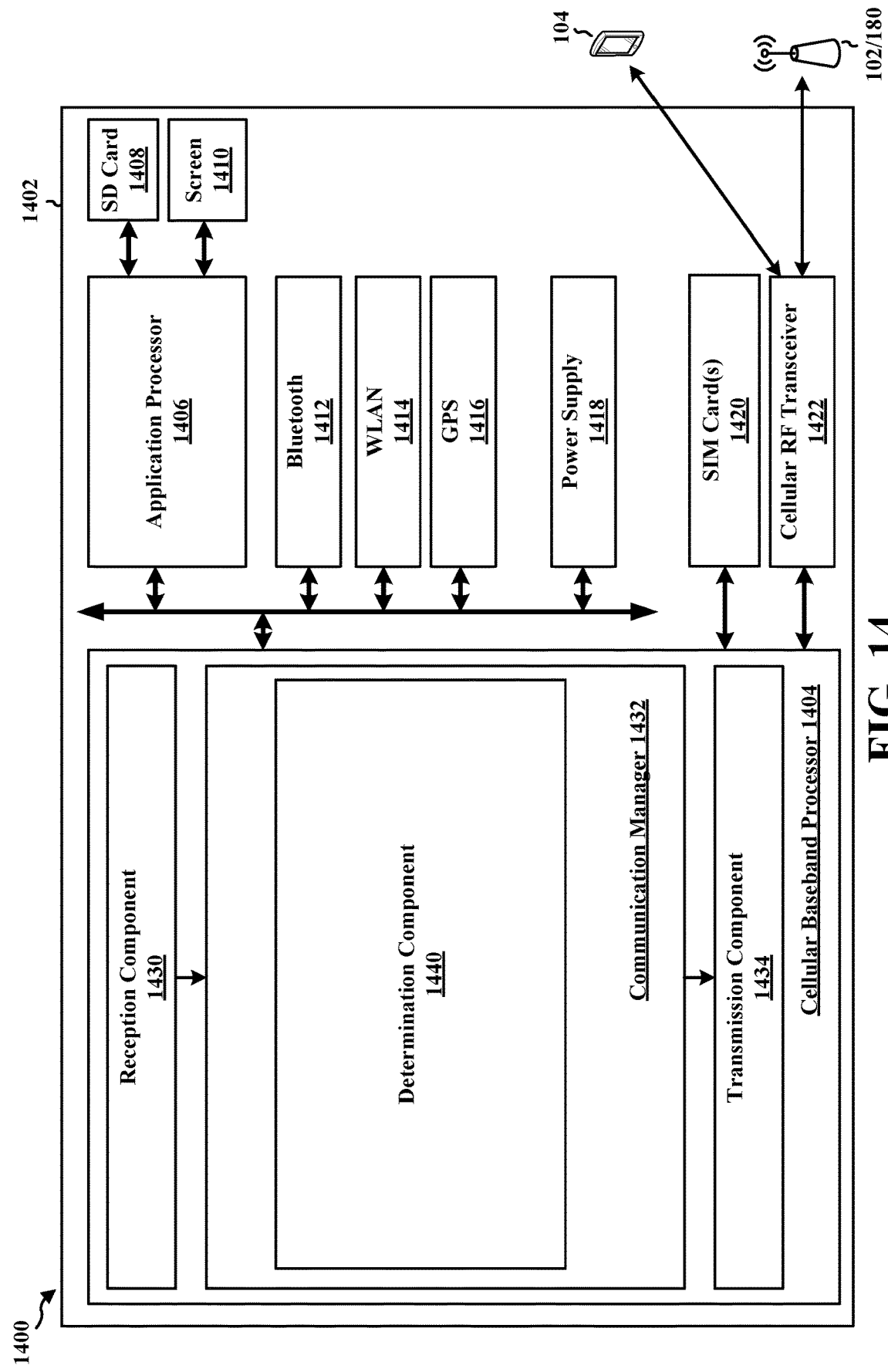
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes a determination component 1440 that is configured to measure one or more candidate bandwidths, each of the one or more candidate bandwidths corresponding to a candidate channel, e.g., as described in connection with step 1102 above. Determination component 1440 may also be configured to select an operating bandwidth of the one or more candidate bandwidths based on the measured one or more candidate bandwidths, the operating bandwidth corresponding to an operating channel, e.g., as described in connection with step 1104 above. Determination component 1440 may also be configured to determine an energy detection threshold of the reference bandwidth, the energy detection threshold being based on at least one of a transmit power or a power class, e.g., as described in connection with step 1106 above. Determination component 1440 may also be configured to measure an interference level of the at least one signal, where the determination whether transmission medium is available is based on the measured interference level, e.g., as described in connection with step 1108 above. Determination component 1440 may also be configured to adjust an energy detection threshold of a reference bandwidth based on the selected operating bandwidth, e.g., as described in connection with step 1110 above. Determination component 1440 may also be configured to compare the adjusted energy detection threshold to the interference level of the at least one signal, e.g., as described in connection with step 1112 above. Determination component 1440 may also be configured to determine whether a transmission medium is available based on at least one of the adjusted energy detection threshold or an interference level of at least one signal, e.g., as described in connection with step 1114 above. Determination component 1440 may also be configured to transmit data via the transmission medium when the interference level of the at least one signal is less than the adjusted energy detection threshold, e.g., as described in connection with step 1116 above. Determination component 1440 may also be configured to refrain from transmitting data via the transmission medium when the interference level of the at least one signal is greater than or equal to the adjusted energy detection threshold, e.g., as described in connection with step 1118 above.

The apparatus may include additional components that perform each of the blocks of the algorithm in the aforementioned flowcharts of FIGS. 9, 10, and 11. As such, each block in the aforementioned flowcharts of FIGS. 9, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for measuring one or more candidate bandwidths, each of the one or more candidate bandwidths corresponding to a candidate channel. The apparatus 1402 may also include means for selecting an operating bandwidth of the one or more candidate bandwidths based on the measured one or more candidate bandwidths, the operating bandwidth corresponding to an operating channel. The apparatus 1402 may also include means for adjusting an energy detection threshold of a reference bandwidth based on the selected operating bandwidth. The apparatus 1402 may also include means for determining whether a transmission medium is available based on at least one of the adjusted energy detection threshold or an interference level of at least one signal. The apparatus 1402 may also include means for determining the energy detection threshold of the reference bandwidth, the energy detection threshold being based on at least one of a transmit power or a power class. The apparatus 1402 may also include means for measuring the interference level of the at least one signal, where the determination whether transmission medium is available is based on the measured interference level. The apparatus 1402 may also include means for comparing the adjusted energy detection threshold to the interference level of the at least one signal. The apparatus 1402 may also include means for transmitting data via the transmission medium when the interference level of the at least one signal is less than the adjusted energy detection threshold. The apparatus 1402 may also include means for refraining from transmitting data via the transmission medium when the interference level of the at least one signal is greater than or equal to the adjusted energy detection threshold. The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
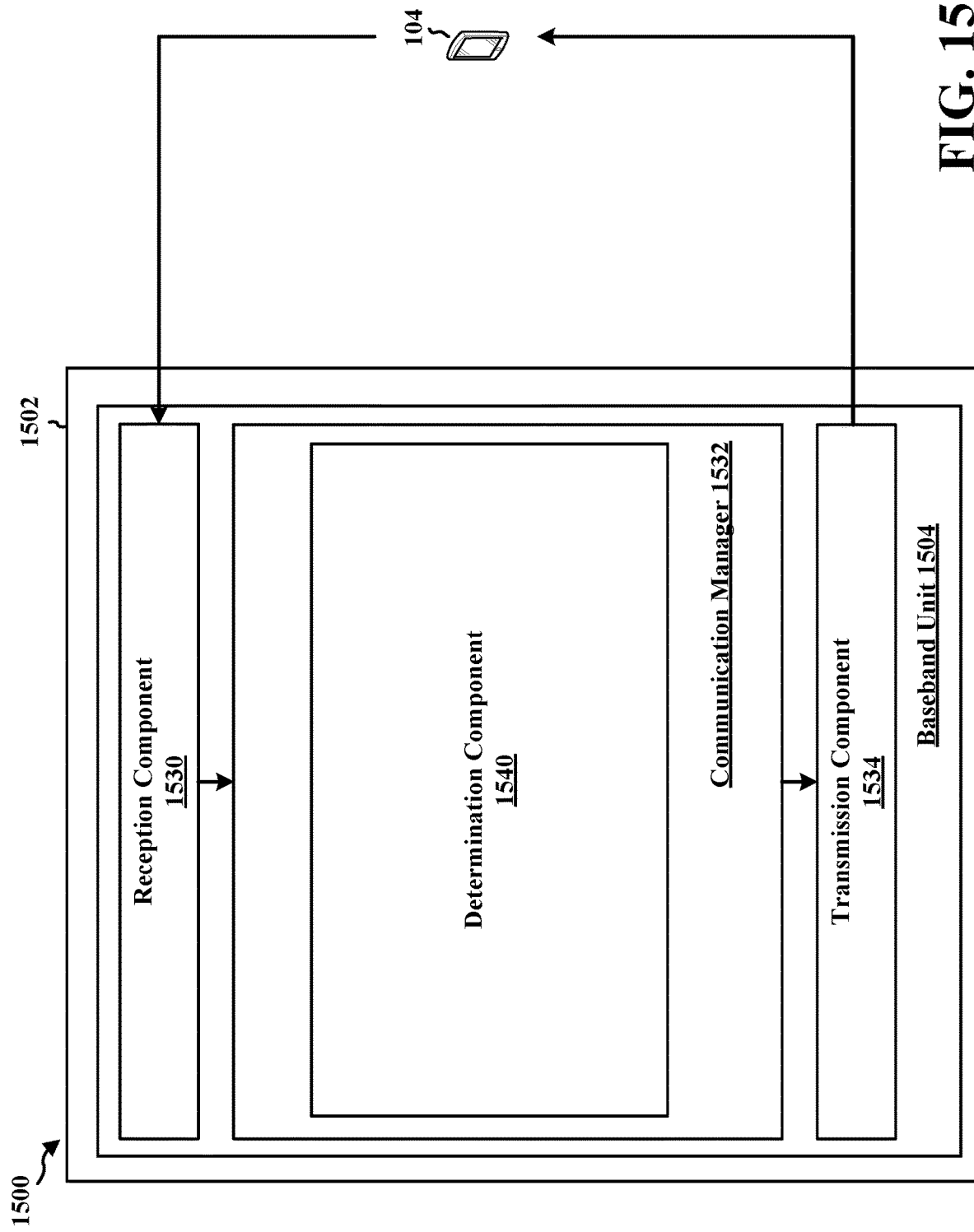
FIG. 15 is a diagram illustrating an example of a hardware implementation for an example apparatus.

FIG. 15 is a diagram 1500 illustrating an example of a hardware implementation for an apparatus 1502. The apparatus 1502 is a base station and includes a baseband unit 1504. The baseband unit 1504 may communicate through a cellular RF transceiver with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The communication manager 1532 includes a determination component 1540 that is configured to measure one or more candidate bandwidths, each of the one or more candidate bandwidths corresponding to a candidate channel, e.g., as described in connection with step 1302 above. Determination component 1540 may also be configured to select an operating bandwidth of the one or more candidate bandwidths based on the measured one or more candidate bandwidths, the operating bandwidth corresponding to an operating channel, e.g., as described in connection with step 1304 above. Determination component 1540 may also be configured to determine an energy detection threshold of the reference bandwidth, the energy detection threshold being based on at least one of a transmit power or a power class, e.g., as described in connection with step 1306 above. Determination component 1540 may also be configured to measure an interference level of the at least one signal, where the determination whether transmission medium is available is based on the measured interference level, e.g., as described in connection with step 1308 above. Determination component 1540 may also be configured to adjust an energy detection threshold of a reference bandwidth based on the selected operating bandwidth, e.g., as described in connection with step 1310 above. Determination component 1540 may also be configured to compare the adjusted energy detection threshold to the interference level of the at least one signal, e.g., as described in connection with step 1312 above. Determination component 1540 may also be configured to determine whether a transmission medium is available based on at least one of the adjusted energy detection threshold or an interference level of at least one signal, e.g., as described in connection with step 1314 above. Determination component 1540 may also be configured to transmit data via the transmission medium when the interference level of the at least one signal is less than the adjusted energy detection threshold, e.g., as described in connection with step 1316 above. Determination component 1540 may also be configured to refrain from transmitting data via the transmission medium when the interference level of the at least one signal is greater than or equal to the adjusted energy detection threshold, e.g., as described in connection with step 1318 above.

The apparatus may include additional components that perform each of the blocks of the algorithm in the aforementioned flowcharts of FIGS. 9, 12, and 13. As such, each block in the aforementioned flowcharts of FIGS. 9, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for measuring one or more candidate bandwidths, each of the one or more candidate bandwidths corresponding to a candidate channel. The apparatus 1502 may also include means for selecting an operating bandwidth of the one or more candidate bandwidths based on the measured one or more candidate bandwidths, the operating bandwidth corresponding to an operating channel. The apparatus 1502 may also include means for adjusting an energy detection threshold of a reference bandwidth based on the selected operating bandwidth. The apparatus 1502 may also include means for determining whether a transmission medium is available based on at least one of the adjusted energy detection threshold or an interference level of at least one signal. The apparatus 1502 may also include means for determining the energy detection threshold of the reference bandwidth, the energy detection threshold being based on at least one of a transmit power or a power class. The apparatus 1502 may also include means for measuring the interference level of the at least one signal, where the determination whether transmission medium is available is based on the measured interference level. The apparatus 1502 may also include means for comparing the adjusted energy detection threshold to the interference level of the at least one signal. The apparatus 1502 may also include means for transmitting data via the transmission medium when the interference level of the at least one signal is less than the adjusted energy detection threshold. The apparatus 1502 may also include means for refraining from transmitting data via the transmission medium when the interference level of the at least one signal is greater than or equal to the adjusted energy detection threshold. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: measure one or more candidate bandwidths, each of the one or more candidate bandwidths corresponding to a candidate channel; select an operating bandwidth of the one or more candidate bandwidths based on the measured one or more candidate bandwidths, the operating bandwidth corresponding to an operating channel; adjust an energy detection threshold of a reference bandwidth based on the selected operating bandwidth; and determine whether a transmission medium is available based on at least one of the adjusted energy detection threshold or an interference level of at least one signal.

Aspect 2 is the apparatus of aspect 1, where the at least one processor is further configured to: determine the energy detection threshold of the reference bandwidth, the energy detection threshold being based on at least one of a transmit power or a power class.

Aspect 3 is the apparatus of any of aspects 1 and 2, where the at least one processor is further configured to: measure the interference level of the at least one signal, where the determination whether the transmission medium is available is based on the measured interference level.

Aspect 4 is the apparatus of any of aspects 1 to 3, where the operating bandwidth corresponds to a sensing bandwidth.

Aspect 5 is the apparatus of any of aspects 1 to 4, where the at least one processor is further configured to: compare the adjusted energy detection threshold to the interference level of the at least one signal, where the transmission medium is available when the interference level of the at least one signal is less than the adjusted energy detection threshold.

Aspect 6 is the apparatus of any of aspects 1 to 5, where the at least one processor is further configured to: transmit data via the transmission medium when the interference level of the at least one signal is less than the adjusted energy detection threshold.

Aspect 7 is the apparatus of any of aspects 1 to 6, where the at least one processor is further configured to: refrain from transmitting data via the transmission medium when the interference level of the at least one signal is greater than or equal to the adjusted energy detection threshold.

Aspect 8 is the apparatus of any of aspects 1 to 7, where the transmission medium corresponds to one or more transmission slots, and the interference level of the at least one signal corresponds to one or more contention slots.

Aspect 9 is the apparatus of any of aspects 1 to 8, where the energy detection threshold is increased when the operating bandwidth increases.

Aspect 10 is the apparatus of any of aspects 1 to 9, where the energy detection threshold is decreased when the operating bandwidth increases.

Aspect 11 is the apparatus of any of aspects 1 to 10, where the energy detection threshold corresponds to a non-increasing function with a minimum threshold.

Aspect 12 is the apparatus of any of aspects 1 to 11, where the energy detection threshold corresponds to a non-decreasing function with a maximum threshold.

Aspect 13 is the apparatus of any of aspects 1 to 12, where the energy detection threshold increases prior to a peak value, and the energy detection threshold decreases after the peak value.

Aspect 14 is the apparatus of any of aspects 1 to 13, further including a transceiver coupled to the at least one processor.

Aspect 15 is a method of wireless communication for implementing any of aspects 1 to 14.

Aspect 16 is an apparatus for wireless communication including means for implementing any of aspects 1 to 14.

Aspect 17 is a computer-readable medium storing computer executable code, where the code when executed by a processor causes the processor to implement any of aspects 1 to 14.

Aspect 18 is an apparatus for wireless communication at a base station including at least one processor coupled to a memory and configured to: measure one or more candidate bandwidths, each of the one or more candidate bandwidths corresponding to a candidate channel; select an operating bandwidth of the one or more candidate bandwidths based on the measured one or more candidate bandwidths, the operating bandwidth corresponding to an operating channel; adjust an energy detection threshold of a reference bandwidth based on the selected operating bandwidth; and determine whether a transmission medium is available based on at least one of the adjusted energy detection threshold or an interference level of at least one signal.

Aspect 19 is the apparatus of aspect 18, where the at least one processor is further configured to: determine the energy detection threshold of the reference bandwidth, the energy detection threshold being based on at least one of a transmit power or a power class.

Aspect 20 is the apparatus of any of aspects 18 and 19, where the at least one processor is further configured to: measure the interference level of the at least one signal, where the determination whether the transmission medium is available is based on the measured interference level.

Aspect 21 is the apparatus of any of aspects 18 to 20, where the operating bandwidth corresponds to a sensing bandwidth.

Aspect 22 is the apparatus of any of aspects 18 to 21, where the at least one processor is further configured to: compare the adjusted energy detection threshold to the interference level of the at least one signal, where the transmission medium is available when the interference level of the at least one signal is less than the adjusted energy detection threshold.

Aspect 23 is the apparatus of any of aspects 18 to 22, where the at least one processor is further configured to: transmit data via the transmission medium when the interference level of the at least one signal is less than the adjusted energy detection threshold.

Aspect 24 is the apparatus of any of aspects 18 to 23, where the at least one processor is further configured to: refrain from transmitting data via the transmission medium when the interference level of the at least one signal is greater than or equal to the adjusted energy detection threshold.

Aspect 25 is the apparatus of any of aspects 18 to 24, where the transmission medium corresponds to one or more transmission slots, and the interference level of the at least one signal corresponds to one or more contention slots.

Aspect 26 is the apparatus of any of aspects 18 to 25, where the energy detection threshold is increased when the operating bandwidth increases.

Aspect 27 is the apparatus of any of aspects 18 to 26, where the energy detection threshold is decreased when the operating bandwidth increases.

Aspect 28 is the apparatus of any of aspects 18 to 27, where the energy detection threshold corresponds to a non-increasing function with a minimum threshold.

Aspect 29 is the apparatus of any of aspects 18 to 28, where the energy detection threshold corresponds to a non-decreasing function with a maximum threshold.

Aspect 30 is the apparatus of any of aspects 18 to 29, where the energy detection threshold increases prior to a peak value, and the energy detection threshold decreases after the peak value.

Aspect 31 is the apparatus of any of aspects 18 to 30, further including a transceiver coupled to the at least one processor.

Aspect 32 is a method of wireless communication for implementing any of aspects 18 to 31.

Aspect 33 is an apparatus for wireless communication including means for implementing any of aspects 18 to 31.

Aspect 34 is a computer-readable medium storing computer executable code, where the code when executed by a processor causes the processor to implement any of aspects 18 to 31.

What is claimed is:

1. A method of wireless communication at a user equipment (UE), comprising:
measuring one or more candidate bandwidths, each of the one or more candidate bandwidths corresponding to a candidate channel;
selecting an operating bandwidth of the one or more candidate bandwidths based on the measured one or more candidate bandwidths, the operating bandwidth corresponding to an operating channel;
adjusting an energy detection threshold of a reference bandwidth based on the selected operating bandwidth, wherein the energy detection threshold corresponds to:
a non-increasing function, wherein the non-increasing function has a minimum value based on lower clipping, wherein the minimum value based on lower clipping begins at the reference bandwidth, or
a non-decreasing function, wherein the non-decreasing function has a maximum value based on upper clipping, wherein the maximum value based on upper clipping begins at the reference bandwidth; and determining whether a transmission medium is available based on at least one of the adjusted energy detection threshold or an interference level of at least one signal.

2. The method of claim 1, further comprising:
determining the energy detection threshold of the reference bandwidth, the energy detection threshold being based on at least one of a transmit power or a power class.

3. The method of claim 1, further comprising:
measuring the interference level of the at least one signal, wherein the determination whether the transmission medium is available is based on the measured interference level.

4. The method of claim 1, wherein the operating bandwidth corresponds to a sensing bandwidth.

5. The method of claim 1, further comprising:
comparing the adjusted energy detection threshold to the interference level of the at least one signal, wherein the transmission medium is available when the interference level of the at least one signal is less than the adjusted energy detection threshold.

6. The method of claim 1, further comprising:
transmitting data via the transmission medium when the interference level of the at least one signal is less than the adjusted energy detection threshold.

7. The method of claim 1, further comprising:
refraining from transmitting data via the transmission medium when the interference level of the at least one signal is greater than or equal to the adjusted energy detection threshold.

8. The method of claim 1, wherein the transmission medium corresponds to one or more transmission slots, and the interference level of the at least one signal corresponds to one or more contention slots.

9. The method of claim 1, wherein the energy detection threshold is increased when the operating bandwidth increases, or
wherein the energy detection threshold is decreased when the operating bandwidth increases.

10. The method of claim 1, wherein the energy detection threshold increases prior to a peak value, and the energy detection threshold decreases after the peak value.

11. An apparatus for wireless communication at a user equipment (UE), comprising:
memory; and
at least one processor coupled to the memory, the at least one processor being configured to:
 measure one or more candidate bandwidths, each of the one or more candidate bandwidths corresponding to a candidate channel;
 select an operating bandwidth of the one or more candidate bandwidths based on the measured one or more candidate bandwidths, the operating bandwidth corresponding to an operating channel;
 adjust an energy detection threshold of a reference bandwidth based on the selected operating bandwidth, wherein the energy detection threshold corresponds to:
  a non-increasing function, wherein the non-increasing function has a minimum value based on lower clipping, wherein the minimum value based on lower clipping begins at the reference bandwidth, or a non-decreasing function, wherein the non-decreasing function has a maximum value based on upper clipping, wherein the maximum value based on upper clipping begins at the reference bandwidth; and
 determine whether a transmission medium is available based on at least one of the adjusted energy detection threshold or an interference level of at least one signal.

12. The apparatus of claim 11, wherein the at least one processor is further configured to:
determine the energy detection threshold of the reference bandwidth, the energy detection threshold being based on at least one of a transmit power or a power class.

13. The apparatus of claim 11, wherein the at least one processor is further configured to:
measure the interference level of the at least one signal, wherein the determination whether the transmission medium is available is based on the measured interference level.

14. The apparatus of claim 11, wherein the operating bandwidth corresponds to a sensing bandwidth.

15. The apparatus of claim 11, wherein the at least one processor is further configured to:
compare the adjusted energy detection threshold to the interference level of the at least one signal, wherein the transmission medium is available when the interference level of the at least one signal is less than the adjusted energy detection threshold.

16. The apparatus of claim 11, wherein the at least one processor is further configured to:
transmit data via the transmission medium when the interference level of the at least one signal is less than the adjusted energy detection threshold, wherein the apparatus further comprises a transceiver coupled to the at least one processor.

17. The apparatus of claim 11, wherein the at least one processor is further configured to:
refrain from transmitting data via the transmission medium when the interference level of the at least one signal is greater than or equal to the adjusted energy detection threshold.

18. The apparatus of claim 11, wherein the transmission medium corresponds to one or more transmission slots, and the interference level of the at least one signal corresponds to one or more contention slots.

19. The apparatus of claim 11, wherein the energy detection threshold is increased when the operating bandwidth increases, or
wherein the energy detection threshold is decreased when the operating bandwidth increases.

20. The apparatus of claim 11, wherein the energy detection threshold increases prior to a peak value, and the energy detection threshold decreases after the peak value.

21. A method of wireless communication at a base station, comprising:
measuring one or more candidate bandwidths, each of the one or more candidate bandwidths corresponding to a candidate channel;
selecting an operating bandwidth of the one or more candidate bandwidths based on the measured one or more candidate bandwidths, the operating bandwidth corresponding to an operating channel;
adjusting an energy detection threshold of a reference bandwidth based on the selected operating bandwidth, wherein the energy detection threshold corresponds to:

a non-increasing function, wherein the non-increasing function has a minimum value based on lower clipping, wherein the minimum value based on lower clipping begins at the reference bandwidth, or a non-decreasing function, wherein the non-decreasing function has a maximum value based on upper clipping, wherein the maximum value based on upper clipping begins at the reference bandwidth; and determining whether a transmission medium is available based on at least one of the adjusted energy detection threshold or an interference level of at least one signal.

22. The method of claim 21, further comprising:
determining the energy detection threshold of the reference bandwidth, the energy detection threshold being based on at least one of a transmit power or a power class.

23. The method of claim 21, further comprising:
measuring the interference level of the at least one signal, wherein the determination whether the transmission medium is available is based on the measured interference level; and
comparing the adjusted energy detection threshold to the interference level of the at least one signal, wherein the transmission medium is available when the interference level of the at least one signal is less than the adjusted energy detection threshold.

24. The method of claim 21, further comprising:
transmitting data via the transmission medium when the interference level of the at least one signal is less than the adjusted energy detection threshold; or
refraining from transmitting data via the transmission medium when the interference level of the at least one signal is greater than or equal to the adjusted energy detection threshold.

25. The method of claim 21, wherein the transmission medium corresponds to one or more transmission slots, and the interference level of the at least one signal corresponds to one or more contention slots.

26. An apparatus for wireless communication at a base station, comprising:
memory; and
at least one processor coupled to the memory, the at least one processor being configured to:
measure one or more candidate bandwidths, each of the one or more candidate bandwidths corresponding to a candidate channel;
select an operating bandwidth of the one or more candidate bandwidths based on the measured one or more candidate bandwidths, the operating bandwidth corresponding to an operating channel;
adjust an energy detection threshold of a reference bandwidth based on the selected operating bandwidth, wherein the energy detection threshold corresponds to:
a non-increasing function, wherein the non-increasing function has a minimum value based on lower clipping, wherein the minimum value based on lower clipping begins at the reference bandwidth, or
a non-decreasing function, wherein the non-decreasing function has a maximum value based on upper clipping, wherein the maximum value based on upper clipping begins at the reference bandwidth; and
determine whether a transmission medium is available based on at least one of the adjusted energy detection threshold or an interference level of at least one signal.

27. The apparatus of claim 26, wherein the at least one processor is further configured to:
determine the energy detection threshold of the reference bandwidth, the energy detection threshold being based on at least one of a transmit power or a power class.

28. The apparatus of claim 26, wherein the at least one processor is further configured to:
measure the interference level of the at least one signal, wherein the determination whether the transmission medium is available is based on the measured interference level; and
compare the adjusted energy detection threshold to the interference level of the at least one signal, wherein the transmission medium is available when the interference level of the at least one signal is less than the adjusted energy detection threshold.

29. The apparatus of claim 26, wherein the at least one processor is further configured to:
transmit data via the transmission medium when the interference level of the at least one signal is less than the adjusted energy detection threshold, wherein the apparatus further comprises a transceiver coupled to the at least one processor; or
refrain from transmitting data via the transmission medium when the interference level of the at least one signal is greater than or equal to the adjusted energy detection threshold.

30. The apparatus of claim 26, wherein the transmission medium corresponds to one or more transmission slots, and the interference level of the at least one signal corresponds to one or more contention slots.

* * * * *